US012795437B2

(12) United States Patent
Song et al.

(10) Patent No.: US 12,795,437 B2
(45) Date of Patent: Nov. 10, 2026

(54) APPARATUS AND METHOD FOR CONTROLLING E2 NODE IN WIRELESS COMMUNICATION SYSTEM

(71) Applicant: Samsung Electronics Co., Ltd., Suwon-si (KR)

(72) Inventors: Junhyuk Song, Suwon-si (KR); Sunheui Ryoo, Suwon-si (KR); Chungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 517 days.

(21) Appl. No.: 18/309,270

(22) Filed: Apr. 28, 2023

(65) Prior Publication Data

US 2023/0269622 A1 Aug. 24, 2023

Related U.S. Application Data

(63) Continuation of application No. PCT/KR2021/015621, filed on Nov. 1, 2021.

(30) Foreign Application Priority Data

Oct. 30, 2020 (KR) ........................ 10-2020-0143908
Nov. 2, 2020 (KR) ........................ 10-2020-0144812
(Continued)

(51) Int. Cl.
*H04W 28/02* (2009.01)

(52) U.S. Cl.
CPC ............................... *H04W 28/0268* (2013.01)

(58) Field of Classification Search
CPC ..... H04W 28/0268; H04W 8/20; H04W 8/26; H04W 8/18
See application file for complete search history.

(56) References Cited

U.S. PATENT DOCUMENTS 10,136,456 B2 11/2018 Song et al.
2020/0154287 A1 5/2020 Novlan et al.
(Continued)

FOREIGN PATENT DOCUMENTS

CN 101031132 A 9/2007
CN 101998320 A 3/2011
(Continued)

OTHER PUBLICATIONS

ORAN; ORAN-WG3.E2SM-NI-v01.00.00, O-RAN Working Group 3 Near-Real-time RAN Intelligent Controller E2 Service Model (E2SM), RAN Function Network Interface (NI).
(Continued)

*Primary Examiner* — Huy D Vu
*Assistant Examiner* — Bao G Nguyen
(74) *Attorney, Agent, or Firm* — Jefferson IP Law, LLP

(57) ABSTRACT

The disclosure relates to a 5$^{th}$ generation (5G) or pre-5G communication system for supporting a data transmission rate higher than 4$^{th}$ generation (4G) communication systems, such as long term evolution (LTE). A method performed by a near-real time (RT) radio access network (RAN) intelligent controller (RIC) is provided. The method includes generating an RIC control request message, transmitting the RIC control request message to an E2 node, and receiving, from the E2 node, an RIC control acknowledge message or an RIC control failure message, wherein the RIC control request message includes a control header and a control message, wherein the control header includes a user equipment (UE) identifier (ID), wherein the control message includes parameters regarding a specific control service, and wherein the specific control service is indicated by an RIC control service style corresponding to a category and an index of the specific control service.

20 Claims, 34 Drawing Sheets

(30) Foreign Application Priority Data

| | | |
|---|---|---|
| Nov. 4, 2020 | (KR) | 10-2020-0146398 |
| Nov. 5, 2020 | (KR) | 10-2020-0147187 |
| Feb. 10, 2021 | (KR) | 10-2021-0019522 |

(56) References Cited

U.S. PATENT DOCUMENTS

| | | | | |
|---|---|---|---|---|
| 2020/0314719 A1 | 10/2020 | Tofighbakhsh et al. | | |
| 2020/0329381 A1 | 10/2020 | Chou et al. | | |
| 2023/0110387 A1* | 4/2023 | Urie | H04W 8/186 | 455/418 |
| 2023/0171592 A1* | 6/2023 | Han | H04W 8/20 | 370/328 |
| 2023/0247688 A1* | 8/2023 | Bucknell | H04W 76/20 | 370/329 |

FOREIGN PATENT DOCUMENTS

| | | | |
|---|---|---|---|
| CN | 111510959 | A | 8/2020 |
| EP | 3 509 372 | A1 | 7/2019 |
| EP | 4187966 | A1 | 5/2023 |
| WO | 2020/131128 | A1 | 6/2020 |

OTHER PUBLICATIONS

Nokia; 5G RAN optimization using the O-RAN software community's RIC (RAN Intelligent Controller), Sep. 23, 2019, ONS Europe.

Extended European Search Report dated Feb. 29, 2024, issued in European Patent Application No. 21886974.1-1216.

O-RAN.WG3.E2AP-v01.01, O-RAN Working Group 3, Near-Real-time RAN Intelligent Controller, E2 Application Protocol (E2AP).

O-RAN.WG3.E2GAP-v01.01, O-RAN Working Group 3, Near-Real-time RAN Intelligent Controller, Architecture & E2 General Aspects and Principles.

International Search Report dated Feb. 21, 2022, issued in International Patent Application No. PCT/KR2021/015621.

Parallel Wireless "OpenRAN 101 Series—Role of RAN Intelligent Controller", Sep. 2020.

O-RAN Use Cases and Deployment Scenarios Whitepaper, Feb. 2020.

Indian Office Action dated Jul. 1, 2026, issued in an Indian Patent Application No. 202317035210.

Chinese Office Action dated Aug. 28, 2026, issued in Chinese Application No. 202180074280.9.

Korean Notice of Patent Grant dated Aug. 29, 2026, issued in Korean Application No. 10-2021-0019522.

* cited by examiner

| IE/Group Name | Presence | Range | IE type and reference | Semantics description |
|---|---|---|---|---|
| Network Interface Type | M | | | |
| Network Interface Identifier | M | | | |
| O-RAN UE ID | O | | | |
| RAN UE Group ID | O | | | |
| RIC Control Message Priority | O | | | |

FIG.14A

| IE/Group Name | Presence | Range | IE type and reference | Semantics description |
|---|---|---|---|---|
| NetworkInterface Type | M | | ENUMERATED (S1,X2, NG, Xn, F1, E1, ...) | |

FIG.14B

| IE/Group Name | Presence | Range | IE type and reference | Semantics description |
|---|---|---|---|---|
| CHOICE NetworkInterfaceIdentifier | M | | | |
| >Global eNB ID | | | As defined in spec 3GPP 36.413 [10] section 9.2.1.37 | For S1, X2 |
| >Global ng-RAN ID | | | As defined in spec 3GPP 36.423 [11] section 9.2.112 | For X2 |
| >Global gNB-DU ID | | | As defined in spec 3GPP 38.413 [12] section 9.3.1.5 | For NG, Xn, F1 E1 |
| >>Global ng-RAN ID | M | | | For F1 |
| >>gNB-DU ID | M | | As defined in spec 3GPP 38.413 [12] section 9.3.1.5 | Used as prefix to gNB-DU ID |
| >Global gNB-CU-UP-ID | | | As defined in spec 3GPP 38.473 [14] section 9.3.1.9 | For F1 |
| >>Global ng-RAN ID | M | | As defined in spec 3GPP 38.413 [12] section 9.3.1.5 | Used as prefix to gNB-CU-UP ID |
| >>gNB-CU-UP ID | M | | As defined in spec 3GPP 38.463 [15] section 9.3.1.15 | For E1 |

FIG.14C

| IE/Group Name | Presence | Range | IE type and reference | Semantics description |
|---|---|---|---|---|
| O-RAN UE ID | M | | INTEGER | |

FIG.14D

| IE/Group Name | Presence | Range | IE type and reference | Semantics description |
|---|---|---|---|---|
| RAN UE Group ID | M | | INTEGER | |

FIG.14E

| IE/Group Name | Presence | Range | IE type and reference | Semantics description |
|---|---|---|---|---|
| ControlMessagePriority | M | | INTEGER | |

FIG.14F

| IE/Group Name | Presence | Range | IE type and reference | Semantics description |
|---|---|---|---|---|
| Network Interface Message | M | | OCTET STRING | |

FIG.15

| IE/Group Name | Presence | Range | IE type and reference | Semantics description |
|---|---|---|---|---|
| Radio Control Interface Message Type | M | | | |
| RAT type | M | | | |
| O-RAN UE ID | O | | | |
| RAN UE Group ID | O | | | |
| RIC Control Message Priority | O | | | |

FIG.16

| IE/Group Name | Presence | Range | IE type and reference | Semantics description |
|---|---|---|---|---|
| Radio Control Interface Message Type | M | | | |
| RAT type | M | | | |
| O-RAN UE ID | O | | | |
| DRB ID | O | | | |
| RAN UE Group ID | O | | | |
| RIC Control Message Priority | O | | | |
| Per UE DCI control message container | O | | | |
| Per UE DCI control message container | O | | | |
| > DCI type for LTE | O | Format 0, Format 1, Format 1A, Format 1B, Format 1C, Format 1D, Format 2, Format 2A, Format 2B, Format 2C, Format 2D, Format 3, Format 3A, Format 4, Format 5, . . . | DCI message format type defined in TS 36.212 | |
| > DCI type for NR | O | Format 0_0, Format 0_1, Format 0_2, Format 1_0, Format 1_1, Format 1_2, Format 2_0, Format 2_1, Format 2_2, Format 2_3, Format 2_4, Format 2_6, Format 3_0, Format 3_1, . . . | DCI message format type defined in TS 38.212 | |
| > DCI Container | O | | message container | |

FIG.17

| RIC Service Style | RIC Service Style Name | Style Description |
|---|---|---|
| 0 | DRB QoS Modification | |
| 1 | QoS Flow to DRB mapping update | |
| 2 | Logical Channel Reconfiguration | |
| 3 | Radio Bearer Admission Control | |
| 4 | DRX Configuration | |
| 5 | Scheduling Request Configuration | |
| 6 | Intra-DU Handover | |
| 7 | Intra-DU Intra-CU Handover | |
| 8 | Intra-CU Handover | |
| 9 | CU-UP relocation handover | |
| 10 | DCI configuration update | |
| 11 | AMBR configuration update | |
| ... | ... | |

FIG.18

| IE/Group Name | Presence | Range | IE type and reference | Semantics description |
|---|---|---|---|---|
| RAN Function Name | M | | PrintableString (SIZE(1..150,...)) | Coded as “O-RAN E2SM-RC” |
| RIC Service Style list | M | | | |
| > RIC Service Style List Item | | <1.. maxNumRIC ServiceStyle> | | |
| >> RIC Service Style | O | (0..65535,..) | | Directly referencing RIC Service style index number. (i.e., index number 0 = DRB QoS Modification, 1 = QoS Flow to DRB mapping update, ...) |

FIG.19

| RIC Service Type | RIC Service Style Index | RIC Service Style Name |
|---|---|---|
| Radio Bearer Control | 0 | DRB QoS Modification |
| | 1 | QoS Flow to DRB mapping update |
| | 2 | Logical Channel Reconfiguration |
| | 3 | Radio Bearer Admission Control |
| | 4 | DRX Configuration |
| | 5 | Scheduling Request Configuration |
| | ... | ... |
| Modility Control | 0 | Intra-DU Handover |
| | 1 | Intra-DU Intra-CU Handover |
| | 2 | Intra-CU Handover |
| | 3 | CU-UP relocation handover |
| | ... | ... |
| ... | ... | ... |

FIG.20

| IE/Group Name | Presence | Range | IE type and reference | Semantics description |
|---|---|---|---|---|
| RAN Function Name | M | | PrintableString (SIZE(1..150,...)) | Coded as “O-RAN E2SM-RC” |
| Supported RIC Service Styles List | | 1 | | |
| Supported RIC Service Styles Item | | 1.. <maxnoofSupportedRicServiceStyleTypes> | | |
| >RIC Service Style Type | M | | ENUMERATED (rbc control, rbc policy, ...) | |
| >RIC Service Style list | M | | | |
| >> RIC Service Style List Item | | <1.. maxNumRICServiceStyle> | | |
| >>> RIC Service Style Index | O | (0..65535,..) | | Directly referencing RIC Service style index number. |

FIG.21

| IE/Group Name | Presence | Range | IE type and reference | Semantics description | Criticality | Assigned Criticality |
|---|---|---|---|---|---|---|
| Message Type | M | | | | YES | reject |
| RIC Request ID | M | | | | YES | reject |
| RAN Function ID | M | | | | YES | reject |
| RIC Call Process ID | 0 | | | | YES | reject |
| RIC Control Header | M | | | | YES | reject |
| RIC Control Message | M | | | | YES | reject |
| RIC Control Ack Request | 0 | | | | YES | reject |

| IE/Group Name | Presence | Range | IE type and reference | Semantics description |
|---|---|---|---|---|
| RIC Control Header | M | | OCTET STRING | Defined in RAN Function specific E2 Service Model |

| IE/Group Name | Presence | Range | IE type and reference | Semantics description |
|---|---|---|---|---|
| UE ID | 0 | | | |
| Group ID | 0 | | | |
| Cell ID | 0 | | | |
| Slice ID | 0 | | | |
| QoS ID | 0 | | | 5QI, QCI |
| DRB ID | 0 | | | |
| QoS Flow ID | 0 | | | |
| PDU Session ID | 0 | | | |

FIG.22

| IE/Group Name | Presence | Range | IE type and reference | Semantics description | Criticality | Assigned Criticality |
|---|---|---|---|---|---|---|
| Message Type | M | | | | YES | reject |
| RIC Request ID | M | | | | YES | reject |
| RAN Function ID | M | | | | YES | reject |
| RIC Call Process ID | O | | | | YES | reject |
| RIC Control Header | M | | | | YES | reject |
| RIC Control Message | M | | | | YES | reject |
| RIC Control Ack Request | O | | | | YES | reject |

| IE/Group Name | Presence | Range | IE type and reference | Semantics description |
|---|---|---|---|---|
| RIC Control Message | M | | OCTET STRING | Defined in RAN Function specific E2 Service Model |

| IE/Group Name | Presence | Range | IE type and reference | Semantics description |
|---|---|---|---|---|
| DRB QoS Modification List | | 0..1 | | |
| >DRB QoS Modification List Item IEs | | 1 .. <maxnoofDRBs> | | |
| >>DRB ID | M | | 8.4.5 | |
| >>CHOICE QoS Information | M | | | |
| >>>E-UTRAN QoS | M | | 8.4.29 | |
| >>>DRB Information | | 1 | | Shall be used for EN-DC case to convey E-RAB Level QoS Parameters. |
| >>>DRB QoS | M | | 8.4.16 | Shall be used for NG-RAN cases. |

FIG.23

| IE/Group Name | Presence | Range | IE type and reference | Semantics description | Criticality | Assigned Criticality |
|---|---|---|---|---|---|---|
| Message Type | M | | | | YES | reject |
| RIC Request ID | M | | | | YES | reject |
| RAN Function ID | M | | | | YES | reject |
| RIC Call Process ID | O | | | | YES | reject |
| RIC Control Header | M | | | | YES | reject |
| RIC Control Message | M | | | | YES | reject |
| RIC Control Ack Request | O | | | | YES | reject |

| IE/Group Name | Presence | Range | IE type and reference | Semantics description |
|---|---|---|---|---|
| RIC Control Message | M | | OCTET STRING | Defined in RAN Function specific E2 Service Model |

| IE/Group Name | Presence | Range | IE type and reference | Semantics description |
|---|---|---|---|---|
| QoS Flow to DRB mapping List | | 0..1 | | |
| >QoS Flow to DRB mapping item IEs | | 1 .. <maxnoofDRBs> | | |
| >>DRB ID | M | | | |
| >>Qos Flows Mapped to DRB List | | 0..1 | | |
| >>>QoS Flows Mapped to DRB Item | | 1 .. <maxnoof QoSFlows> | | |
| >>>QoS Flow Identifier | M | | INTEGER (0 ..63) | This IE identifies a Qos Flow within a PDU Session. The definition and use of the QoS Flow Identifieris specified in TS 23.501 |
| >>>>Qos Flow Mapping Indication | O | | ENUMERATED (ul, dl, ...) | Indicates that only the uplink or downlink Qos flow is mapped to the DRB. |

FIG.24

| IE/Group Name | Presence | Range | IE type and reference | Semantics description | Criticality | Assigned Criticality |
|---|---|---|---|---|---|---|
| Message Type | M | | | | YES | reject |
| RIC Request ID | M | | | | YES | reject |
| RAN Function ID | M | | | | YES | reject |
| RIC Call Process ID | O | | | | YES | reject |
| RIC Control Header | M | | | | YES | reject |
| RIC Control Message | M | | | | YES | reject |
| RIC Control Ack Request | O | | | | YES | reject |

| IE/Group Name | Presence | Range | IE type and reference | Semantics description |
|---|---|---|---|---|
| RIC Control Message | M | | OCTET STRING | Defined in RAN Function specific E2 Service Model |

| IE/Group Name | Presence | Range | IE type and reference | Semantics description |
|---|---|---|---|---|
| Logical Channel Reconfiguration List | | 0..1 | | |
| >Logical Channel Reconfiguration Item IEs | | 1 .. <maxLC-ID> | | |
| >>Logical Ghannel Identity | M | | INTEGER (1..maxLC-ID) | |
| >>Logical Channel Config | | | | |
| >>>Priority | M | | INTEGER (1..16) | Logical channel priority |
| >>>Prioritised Bit Rate | M | | ENUMERATED (kBps0, kBps8, kBps16, kBps32, kBps64, kBps128, kBps256, kBps512, kBps1024, kBps2048, kBps4096, kBps8192, kBps16384, kBps32768, kBps65536, infinity) | Value in kiloBytes/s |
| >>>Bucket Size Duration | M | | ENUMERATED (ms5, ms10, ms20, ms50, ms100, ms150, ms300, ms500, ms1000, spare7, spare6, spare5, spare4, spare3, spare2, spare1) | Value in ms |

| Range bound | Explanation |
|---|---|
| maxLC-ID | Maximum value of Logical Channel ID. Value is 32. |

FIG.25

| IE/Group Name | Presence | Range | IE type and reference | Semantics description | Criticality | Assigned Criticality |
|---|---|---|---|---|---|---|
| Message Type | M | | | | YES | reject |
| RIC Request ID | M | | | | YES | reject |
| RAN Function ID | M | | | | YES | reject |
| RIC Call Process ID | O | | | | YES | reject |
| RIC Control Header | M | | | | YES | reject |
| RIC Control Message | M | | | | YES | reject |
| RIC Control Ack Request | O | | | | YES | reject |

| IE/Group Name | Presence | Range | IE type and reference | Semantics description |
|---|---|---|---|---|
| RIC Control Message | M | | OCTET STRING | Defined in RAN Function specific E2 Service Model |

| IE/Group Name | Presence | Range | IE type and reference | Semantics description |
|---|---|---|---|---|
| DRB To Add List | | 0..1 | | |
| >DRB To Add Item IEs | | 1 .. < maxnoofDRBs > | | |
| >>DRB ID | M | | 8.4.6 | |
| >>DRB QoS | M | | 8.4.16 | |
| DRB To Release List | | 0..1 | | |
| >DRB To Release Item IEs | | 1 .. < maxnoofDRBs > | | |
| >>DRB ID | M | | 8.4.6 | |

| Range bound | Explanation |
|---|---|
| maxnoofDRBs | Maximum no. of DRB allowed towards one UE, the maximum value is 64. |

FIG.26

APPARATUS AND METHOD FOR CONTROLLING E2 NODE IN WIRELESS COMMUNICATION SYSTEM

CROSS-REFERENCE TO RELATED APPLICATION(S)

This application is a continuation application, claiming priority under § 365 (c), of an International application No. PCT/KR2021/015621, filed on Nov. 1, 2021, which is based on and claims the benefit of a Korean patent application number 10-2020-0143908, filed on Oct. 30, 2020, in the Korean Intellectual Property Office, of a Korean patent application number 10-2020-0144812, filed on Nov. 2, 2020, in the Korean Intellectual Property Office, of a Korean patent application number 10-2020-0146398, filed on Nov. 4, 2020, in the Korean Intellectual Property Office, of a Korean patent application number 10-2020-0147187, filed on Nov. 5, 2020, in the Korean Intellectual Property Office, and of a Korean patent application number 10-2021-0019522, filed on Feb. 10, 2021, in the Korean Intellectual Property Office, the disclosure of each of which is incorporated by reference herein in its entirety.

BACKGROUND

1. Field

The disclosure relates to an apparatus and a method for controlling an E2 node by a radio access network (RAN) intelligent controller (RIC) in a radio access network. More particularly, the disclosure relates to an apparatus and a method for controlling an E2 node through an E2 message conforming to open radio access network (O-RAN) specifications of a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a “beyond 4G network” communication system or a “post long term evolution (post LTE)” system.

The 5G communication system is considered to be implemented in ultrahigh frequency bands so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (COMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The 5G system or new radio or next radio (NR) has been commercialized to satisfy demands for wireless data traffic, and high data rate services are provided to users through the 5G system similarly to 4G. Further, it is predicted that wireless communication services having various purposes, such as the Internet of Things, and services requiring high reliability for specific purposes are expected to be provided. An open radio access network (O-RAN), established by operators and equipment providers in a system in which a current 4G communication system and a 5G system are mixed, defines network elements (NEs) and interface specifications based on the existing third generation partnership project (3GPP) specifications, and proposes an O-RAN architecture.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method in which a radio access network (RAN) intelligent controller (RIC) performs control of an E2 node in a wireless communication system.

Another aspect of the disclosure is to provide an apparatus and a method for configuring an E2 node by a RIC into a specific mode so that the E2 node operates under the control of the RIC.

Additional aspects will be set forth in part in the description which follows and, in part, will be apparent from the description, or may be learned by practice of the presented embodiments.

In accordance with an aspect of the disclosure, a method performed by a near-real time (RT) radio access network (RAN) intelligent controller (RIC) is provided. The method includes generating a RIC control request message, transmitting the RIC control request message to an E2 node, and receiving, from the E2 node, a RIC control acknowledge message or a RIC control failure message, wherein the RIC control request message includes a control header and a control message, wherein the control header includes a user equipment (UE) identifier (ID), wherein the control message includes one or more parameters regarding a specific control service, and wherein the specific control service is indicated by a RIC control service style corresponding to a category and an index of the specific control service in the RIC control service style.

In accordance with another aspect of the disclosure, a method performed by an E2 node is provided. The method includes receiving a radio access network (RAN) intelligent controller (RIC) control request message from a near-real time (RT) RIC, and transmitting, to the near-RT RIC, a RIC control acknowledge message or a RIC control failure message, wherein the RIC control request message includes a control header and a control message, wherein the control header includes a user equipment (UE) identifier (ID), wherein the control message includes one or more parameters regarding a specific control service, and wherein the specific control service is indicated by a RIC control service style corresponding to a category and an index of the specific control service in the RIC control service style.

In accordance with another aspect of the disclosure, an apparatus of a near-real time (RT) radio access network (RAN) intelligent controller (RIC) is provided. The apparatus includes at least one transceiver, and at least one processor coupled with the transceiver and configured to generate a RIC control request message, transmit the RIC control request message to an E2 node, and receive, from the E2 node, a RIC control acknowledge message or a RIC control failure message, wherein the RIC control request message includes a control header and a control message, wherein the control header includes a user equipment (UE) identifier (ID), wherein the control message includes one or more parameters regarding a specific control service, and wherein the specific control service is indicated by a RIC control service style corresponding to a category and an index of the specific control service in the RIC control service style.

In accordance with another aspect of the disclosure, an apparatus of an E2 node is provided. The apparatus includes at least one transceiver, and at least one processor coupled with the transceiver and configured to receive a radio access network (RAN) intelligent controller (RIC) control request message from a near-real time (RT) RIC, and transmit, to the near-RT RIC, a RIC control acknowledge message or a RIC control failure message, wherein the RIC control request message includes a control header and a control message, wherein the control header includes a user equipment (UE) identifier (ID), wherein the control message includes one or more parameters regarding a specific control service, and wherein the specific control service is indicated by a RIC control service style corresponding to a category and an index of the specific control service in the RIC control service style.

In accordance with another aspect of the disclosure, a method performed by an E2 node or a method performed by a radio access network (RAN) intelligent controller (RIC) is provided. The method includes receiving a setup message from an E2 node, generating a control message based on the setup message, and transmitting the control message to the E2 node, wherein the control message includes a message for transfer to another E2 node by the E2 node.

An apparatus and a method according to various embodiments of the disclosure enable a radio access network (RAN) intelligent controller (RIC) to control an E2 node.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14A illustrates an E2SM control header supported by an O-RAN E2 service model used in an E2SM-RIC according to an embodiment of the disclosure;

FIG. 14B illustrates a network interface type of an E2SM control header supported by an O-RAN E2 service model used in an E2SM-RIC according to an embodiment of the disclosure;

FIG. 14C illustrates a network interface identifier of an E2SM control header supported by an O-RAN E2 service model used in an E2SM-RIC according to an embodiment of the disclosure;

FIG. 14D illustrates O-RAN UE ID of an E2SM control header supported by an O-RAN E2 service model used in an E2SM-RIC according to an embodiment of the disclosure;

FIG. 14E illustrates a RAN UE group ID of an E2SM control header supported by an O-RAN E2 service model used in an E2SM-RIC according to an embodiment of the disclosure;

FIG. 14F illustrates RIC control message priority of an E2SM control header supported by an O-RAN E2 service model used in an E2SM-RIC according to an embodiment of the disclosure;

FIG. 15 illustrates a network interface message container located in a message body indicated by an E2SM control header supported by an O-RAN E2 service model used in an E2SM-RIC according to an embodiment of the disclosure;

FIG. 16 illustrates a radio control interface located in a message body indicated by an E2SM control header supported by an O-RAN E2 service model used in an E2SM-RIC according to an embodiment of the disclosure;

FIG. 17 illustrates delivery of downlink control information (DCI) through a message body indicated by an E2SM control header supported by an O-RAN E2 service model used in an E2SM-RIC according to an embodiment of the disclosure;

FIG. 18 illustrates delivery of RIC service style supported by an O-RAN E2 service model according to an embodiment of the disclosure;

FIG. 19 illustrates a message format for RIC service style supported by an O-RAN E2 service model according to an embodiment of the disclosure;

FIG. 20 illustrates delivery of RIC service style supported by an O-RAN E2 service model according to an embodiment of the disclosure;

FIG. 21 illustrates a message format for RIC service style supported by an O-RAN E2 service model according to an embodiment of the disclosure;

FIG. 22 illustrates a RIC control header in RIC control according to an embodiment of the disclosure;

FIG. 23 illustrates a RIC control message in RIC control according to an embodiment of the disclosure;

FIG. 24 illustrates a RIC control message in RIC control according to an embodiment of the disclosure;

FIG. 25 illustrates a RIC control message in RIC control according to an embodiment of the disclosure; and FIG. 26 illustrates a RIC control message in RIC control according to an embodiment of the disclosure.

Throughout the drawings, it should be noted that like reference numbers are used to depict the same or similar elements, features, and structures.

DETAILED DESCRIPTION

Figure 1:
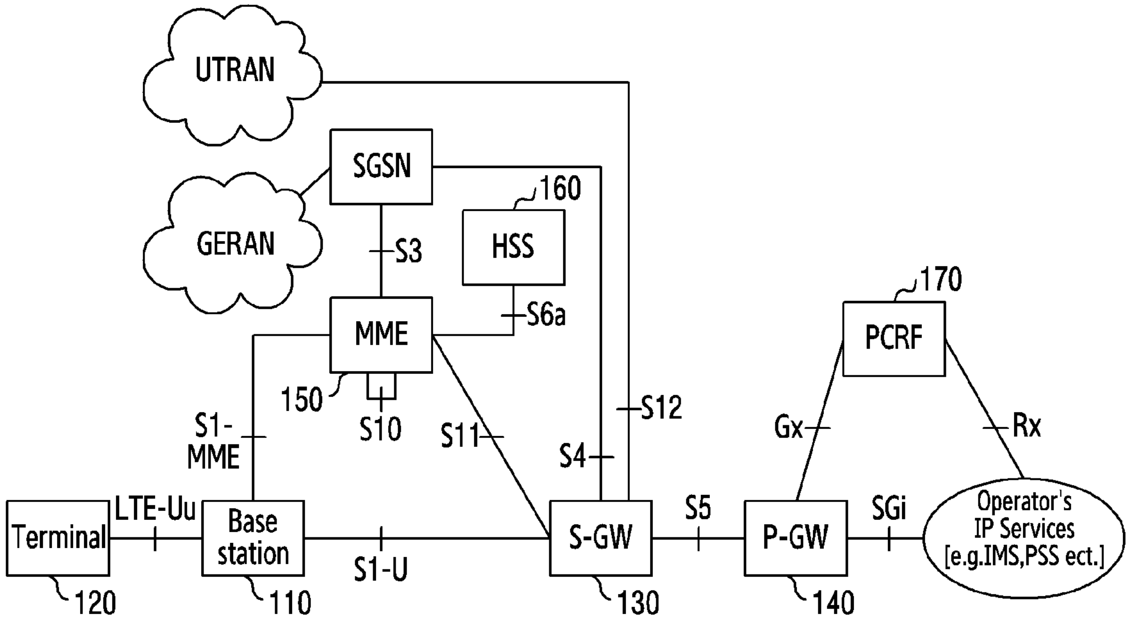
FIG. 1 illustrates a $4^{th}$ generation (4G) long-term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for performing a subscription procedure between a device in a radio access network (RAN) and a device configured to control the RAN in a wireless communication system. Specifically, the disclosure relates to an apparatus and a method for measuring UE-specific performance on an E2 interface in a radio access network, and slice-specific resource management of a base station. The disclosure relates to an apparatus and a method for container-based measurement message delivery when a service event for a base station conforming to open radio access network (O-RAN) specifications using an E2 message of a wireless communication system occurs.

In the following description, terms referring to signals, terms referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

As used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

In the disclosure, various embodiments will be described using terms employed in some communication standards (e.g., the 3rd generation partnership project (3GPP) and the open radio access network (O-RAN)), but they are only for the sake of illustration. The embodiments of the disclosure may also be easily applied to other communication systems through modifications.

With the commercialization of $4^{th}$ generation (4G)/$5^{th}$ generation (5G) communication systems (e.g., new radio (NR)), a virtualized network needs to provide differentiated service support for users. 3GPP is a joint research project among organizations related to mobile communication, and aims to make a 3G mobile communication system standard-applicable worldwide-within the scope of the IMT-2000 project of the international telecommunication union (ITU). 3GPP has been established in December 1998, and the 3GPP specifications is based on the advanced GSM standard and includes radio and core network and service architecture all within the scope of standardization. Accordingly, an open radio access network (O-RAN) redefines a radio unit (RU), a digital unit (DU), a central unit (CU)-control plane (CP), and a CU-user plane (UP), which are nodes configuring a 3GPP network entity (NE) and a base station, as O-RAN (O)-RU, O-DU, O-CU-CP, and O-CU-UP, respectively, and further standardizes a near-real-time (NRT) radio access network intelligent controller (RIC). The disclosure is to support an operator specific service model in an E2 interface where an RIC requests a service from the O-DU, O-CU-CP, or O-CU-UP. Here, O-RU, O-DU, O-CU-CP, and O-CU-UP may be understood as objects configuring a RAN that may operate according to the O-RAN specifications, and may be referred to as an E2 node. An interface with objects configuring a RAN that may operate according to the O-RAN specifications between an RIC and E2 nodes uses an E2 application protocol (E2AP).

The RIC is a logical node capable of collecting information on a cell site in which transmission or reception occurs between a UE and the O-DU, O-CU-CP, or O-CU-UP. The RIC may be implemented in the form of a server densely deployed at one physical site. The O-DU and RIC, O-CU-CP and RIC, and O-CU-UP and RIC may be connected via an Ethernet network. To this end, the communication between the O-DU and RIC, between the O-CU-CP and RIC, and between the O-CU-UP and RIC requires interface specifications, and requires message formats, such as E2-DU, E2-CU-CP, E2-CU-UP and process definitions between the O-DU, O-CU-CP, O-CU-UP, and RIC. In particular, users in the virtualized network need differentiated service support and it is necessary to define the functionality of the messages of E2-DU, E2-CU-CP and E2-CU-UP to support wide cell coverage services by centralizing call processing messages/functions generated in the O-RAN on the RIC.

The RIC may communicate with the O-DU, O-CU-CP, and O-CU-UP using the E2 interface, and may configure an event generation condition by generating and transmitting a subscription message. Specifically, the RIC may configure the call processing EVENT by generating an E2 subscription request message and delivering the message to an E2 node (e.g., O-CU-CP, O-CU-UP, O-DU). In addition, after configuring the EVENT, the E2 node transmits the subscription request response message delivered to the RIC.

The E2 node may transmit a current state to the RIC through E2 indication/report. The RIC may provide control of O-DU, O-CU-CP, and O-CU-UP using an E2 control message. Various embodiments of the disclosure propose an E2 indication message for transmission of UE-specific measurement information, for each period configured in a subscription event condition in the O-DU. In addition, various embodiments of the disclosure propose a message for controlling a resource transmitted to the O-DU from the RIC.

FIG. 1 illustrates a $4^{th}$ generation (4G) long-term evolution (LTE) core system according to an embodiment of the disclosure.

Referring to FIG. 1, the LTE core system includes a base station 110, a terminal 120, a serving gateway (S-GW) 130, a packet data network gateway (P-GW) 140, a mobility management entity (MME) 150, a home subscriber server (HSS) 160, and a policy and charging rule function (PCRF) 170.

The base station 110 is a network infrastructure for providing radio access to the terminal 120. For example, the base station 110 is a device that performs scheduling by collecting status information, such as a buffer status, available transmission power, and a channel status of the terminal 120. The base station 110 has a coverage defined as a predetermined geographic area based on a distance over which signals can be transmitted. The base station 110 is connected to the MME 150 via an S1-MME interface. In addition to base stations, the base station 110 may also be referred to as an "access point (AP)", "eNodeB (eNB)", "wireless point", "transmission/reception point (TRP)" or other terms having equivalent technical meaning thereof.

The terminal 120 is a device used by a user and performs communication with the base station 110 through a radio channel. In some cases, the terminal 120 may operate without user involvement. For example, at least one of the terminal 120 and the S-GW 130 is a device performing machine type communication (MTC) and may not be carried by a user. In addition to the terminal, the terminal 120 may be referred to as "UE", "mobile station", "subscriber station", "customer-premises equipment (CPE)", "remote terminal", "wireless terminal", or "user device" or other terms having equivalent technical meaning thereof.

The S-GW 130 provides data bearers and generates or controls data bearers under the control of the MME 150. For example, the S-GW 130 processes packets arriving from base station 110 or packets to be forwarded to the base station 110. Further, the S-GW 130 may perform an anchoring role in handover of the terminal 120 between base stations. The P-GW 140 may operate as a connection point with an external network (e.g., an Internet network). In addition, the P-GW 140 assigns an Internet Protocol (IP) address to the terminal 120 and serves as an anchor for the S-GW 130. In addition, the P-GW 140 may apply a quality of service (QoS) policy of the terminal 120 and manage account data.

MME 150 manages mobility for terminal 120. Further, the MME 150 may perform authentication, bearer management, or the like, for the terminal 120. For example, the MME 150 is responsible for mobility management and various control functions of the terminal. The MME 150 may cooperate with a serving GPRS support node (SGSN).

The HSS 160 stores key information and user profiles for authentication of the terminal 120. When the terminal 120 accesses the network, key information and user profiles are transmitted from the HSS 160 to the MME 150.

The PCRF 170 defines policy and charging rules. The stored information is forwarded from the PCRF 180 to the P-GW 140, and the P-GW 140 may control the terminal 120 (e.g., QoS management, charging, or the like) based on the information provided from the PCRF 180.

A carrier aggregation (hereinafter, referred to as "CA") technique is a technique of combining a plurality of component carriers and simultaneously transmitting and receiving signals using the plurality of component carriers by one terminal, thereby improving frequency use efficiency in terms of the terminal or the base station. Specifically, according to the CA technology, a terminal and a base station may use broadband transmission and reception signals using a plurality of component carriers in uplink (UL) and downlink (DL), wherein the component carriers are located at different frequency bands, respectively. Hereinafter, UL denotes a communication link through which the terminal transmits a signal to the base station, and DL denotes a communication link through which the base station transmits a signal to the terminal. Here, the number of uplink component carriers and downlink component carriers may be different.

Dual connectivity or multi-connectivity is a technique for improving frequency use efficiency in terms of terminals or base stations, in which one terminal is connected to a plurality of different base stations and simultaneously transmits and receives signals using carriers positioned in the plurality of base stations under different frequency bands. The terminal may simultaneously be connected to a first base station (e.g., a base station that provides service using an LTE technology or a 4G mobile communication technology) and a second base station (e.g., a base station that provides service using a new radio (NR) technology or a $5^{th}$ generation (5G) mobile communication technology) to transmit and receive traffic. In this case, the frequency resources used by each base station may be located in different frequency bands. Therefore, the operation scheme of the LTE and NR based dual connectivity scheme may be referred to as 5G non-standalone (NSA).

Figure 2A:
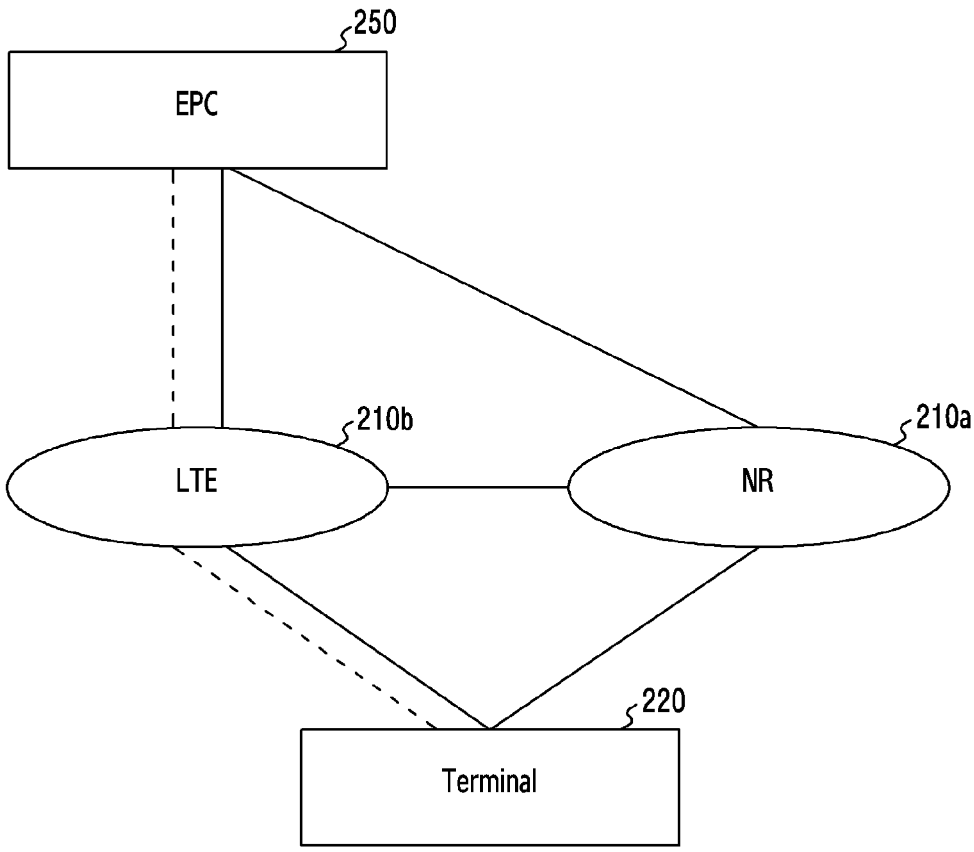
FIG. 2A illustrates a $5^{th}$ generation (5G) non-standalone (NSA) system according to an embodiment of the disclosure.

FIG. 2A illustrates a 5G NSA system according to an embodiment of the disclosure.

Referring to FIG. 2A, the 5G NSA system includes an NR RAN 210*a*, an LTE RAN 210*b*, a terminal 220, and an evolved packed core (EPC) 250. The NR RAN 210*a* and the LTE RAN 210*b* are connected to the EPC 250, and the terminal 220 may be simultaneously served by either or both of the NR RAN 210*a* and the LTE RAN 210*b*. The NR RAN

210$a$ includes at least one NR base station and the LTE RAN 210$b$ includes at least one LTE base station. Here, an NR base station may be referred to as a "$5^{th}$ generation node (5G node)", "next generation node B (gNB)", or other terms having equivalent technical meaning. Further, the NR base station may have a structure divided into central unit (CU) and digital unit (DU), and the CU may also have a structure divided into a CU-control plane (CP) unit and a CU-user plane (UP) unit.

In the structure shown in FIG. 2A, the terminal 220 may perform radio resource control (RRC) access through a first base station (e.g., a base station belonging to the LTE RAN 210$b$) and may receive services with functions (e.g., connection management, mobility management, or the like) provided in a control plane. Further, the terminal 220 may receive additional radio resources for transmitting and receiving data via a second base station (e.g., a base station belonging to the NR RAN 210$a$). This dual connectivity technique using LTE and NR may be referred to as evolved universal terrestrial radio access (E-UTRA)-NR-dual connectivity (EN-DC). Similarly, a dual connectivity technique where a first base station uses an NR technique and a second base station uses an LTE technique is referred to as NR-E-UTRA dual connectivity (NE-DC). Furthermore, various embodiments may be applied to various types of multi-connection and CA technologies. Furthermore, various embodiments may be applicable even in case that the first system using the first communication technology and the second system using the second communication technology are implemented in one device, or in case that the first base station and the second base station are located in the same geographical location.

Figure 2B:
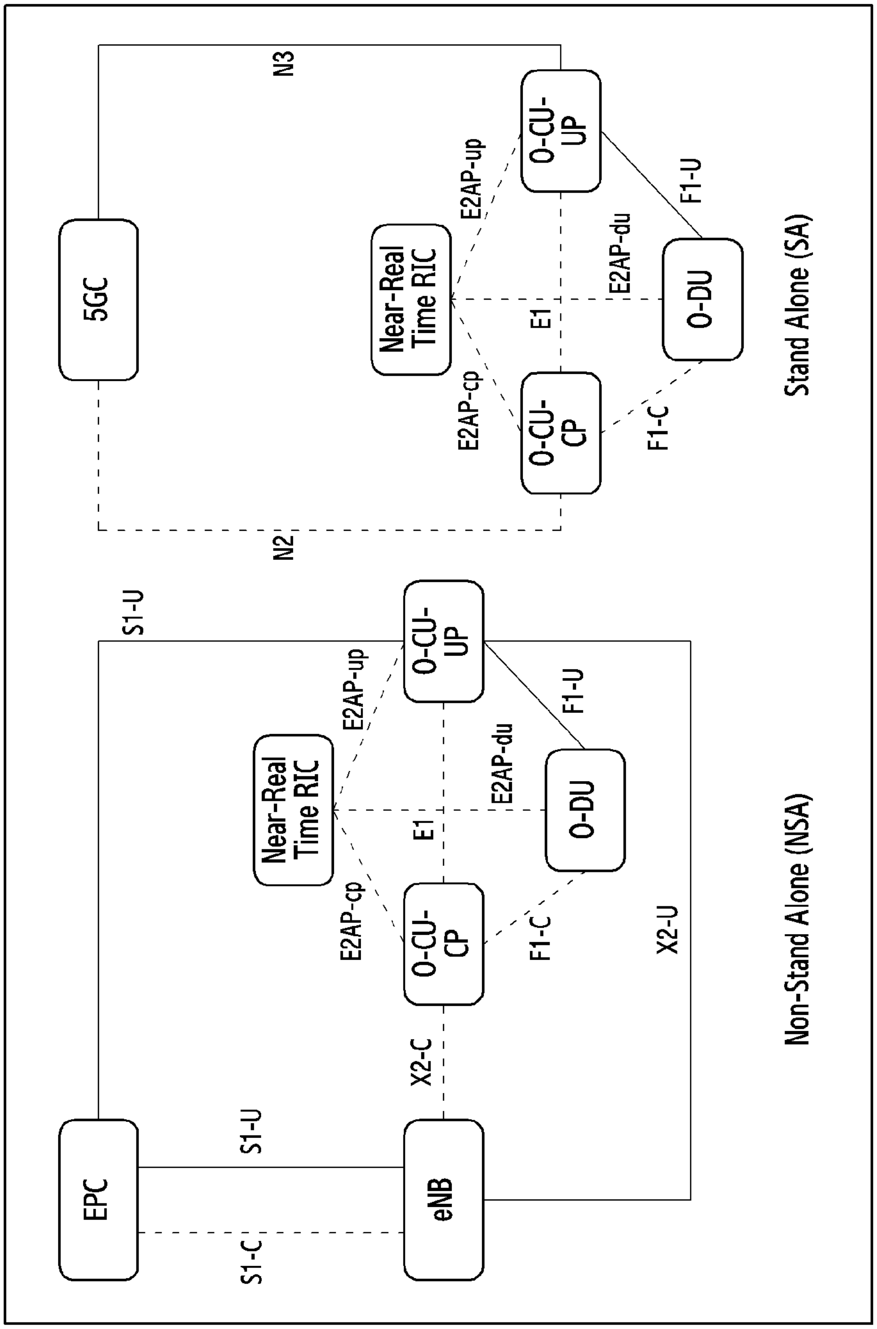
FIG. 2B illustrates an architecture for an O-RAN according to an embodiment of the disclosure.

FIG. 2B illustrates an architecture of a O-RAN according to an embodiment of the disclosure. For E2-SM-key performance indicator (KPI) monitoring (KPIMON) of an E2 service model, while the O-RAN non-standalone in multi-connectivity operation using E-UTRA and NR radio access technologies is considered, the E2 node may be assumed to be in O-RAN standalone mode.

Referring to FIG. 2B, when deploying O-RAN non-standalone mode, the eNB is connected with the EPC via S1-C/S1-U interface and with the O-CU-CP via X2 interface. The O-CU-CP for deploying the O-RAN standalone mode may be connected with a 5G core (5GC) through an N2/N3 interface.

Figure 3:
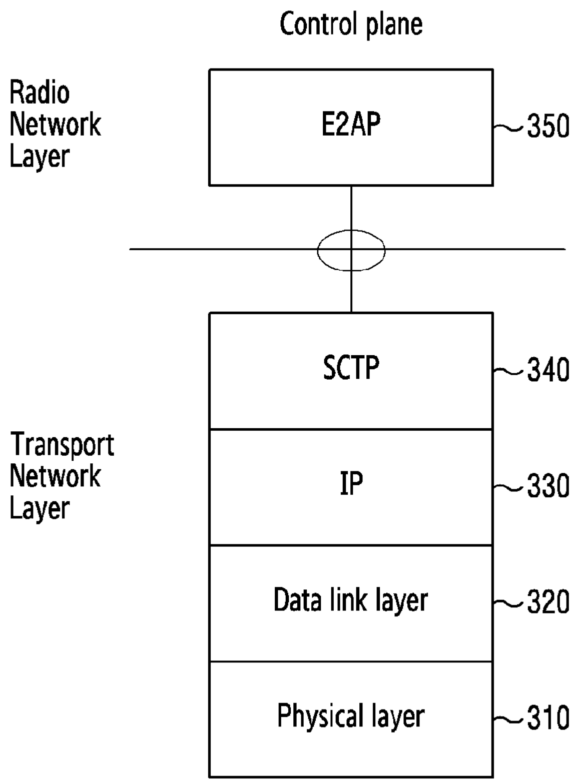
FIG. 3 illustrates a protocol stack of an E2 application protocol message in a radio access network according to an embodiment of the disclosure.

FIG. 3 illustrates a protocol stack of E2 application protocol messages in a radio access network according to an embodiment of the disclosure.

Referring to FIG. 3, a control plane includes a transport network layer and a radio network layer. The transport network layer includes a physical layer 310, a data link layer 320, an Internet protocol (IP) 330, and a stream control transmission protocol (SCTP) 340.

The radio network layer includes E2AP 350. The E2AP 350 is used to submit subscription messages, indication messages, control messages, service update messages, and service query messages, and transmitted in a higher layer of SCTP 340 and IP 330.

Figure 4:
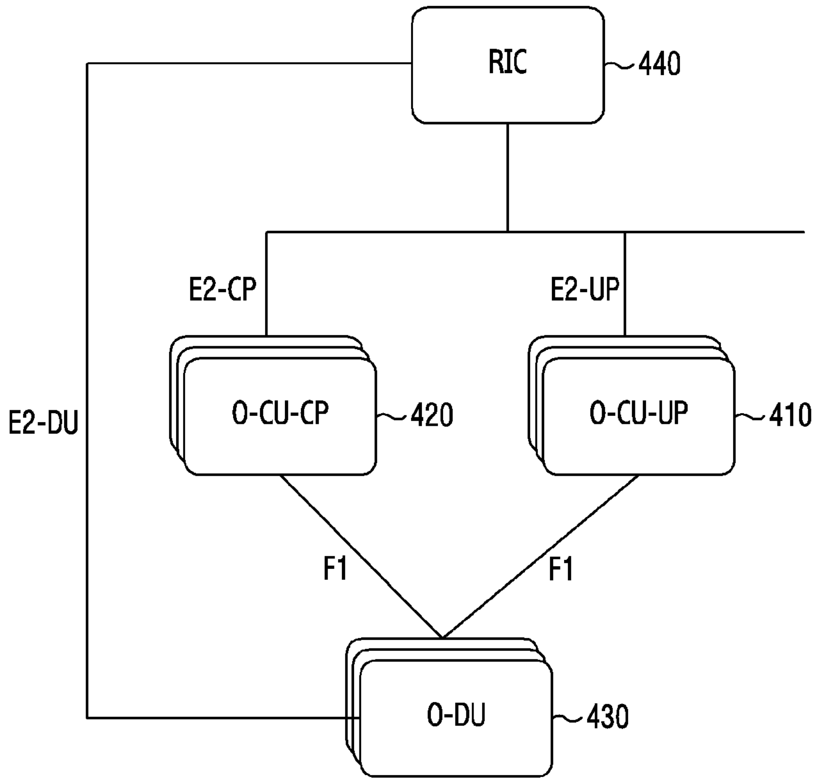
FIG. 4 illustrates a connection between a base station and a radio access network intelligence controller (RIC) in a radio access network according to an embodiment of the disclosure.

FIG. 4 illustrates a connection between a base station and a radio access network intelligence controller (RIC) in a radio access network, according to an embodiment of the disclosure.

Referring to FIG. 4, a RIC 440 is connected to O-CU-CP 420, O-CU-UP 410, and O-DU 430. The RIC 440 is a device for customizing RAN functionality for new service or regional resource optimization. The RIC may provide functions, such as network intelligence (e.g., policy enforcement, handover optimization), resource guarantees (e.g., radio-link management, advanced self-organizing network (SON)), resource control (e.g., load balancing, slicing policies). The RIC 440 may communicate with the O-CU-CP 420, the O-CU-UP 410, and the O-DU 430. RIC 440 may be connected to each node via E2-CP, E2-UP, and E2-DU interfaces. Further, the interfaces between the O-CU-CP and the DU and between the O-CU-UP and the DU may be referred to as F1 interfaces. In the following description, DU and O-DU, CU-CP and O-CU-CP, and CU-UP and O-CU-UP may be interchangeably used.

Although FIG. 4 shows one RIC 440, there may be multiple RICs according to various embodiments of the disclosure. Multiple RICs may be implemented with multiple pieces of hardware located in the same physical location, or may be implemented through virtualization using a single piece of hardware.

Figure 5:
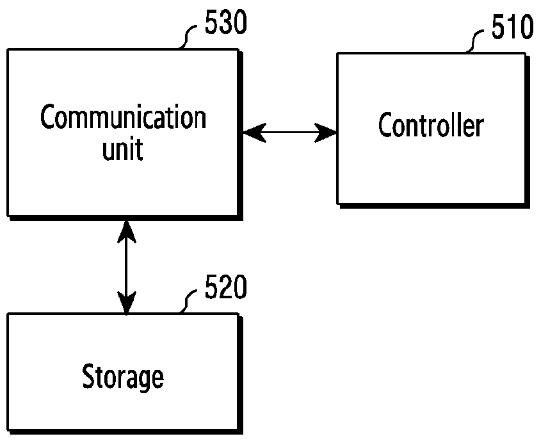
FIG. 5 illustrates a configuration of a device in a radio access network according to an embodiment of the disclosure.

FIG. 5 illustrates a configuration of a device according to an embodiment of the disclosure. The structure shown in FIG. 5 may be understood as a configuration of a device having at least one function of RIC, O-CU-CP, O-CU-UP, and O-DU of FIG. 5. Terms, such as "~ unit" or "~ device" used hereinafter implies a unit for processing at least one function or operation, and may be implemented using hardware, software, or a combination of hardware and software.

Referring to FIG. 5, a core network device includes a communication unit 510, a storage 520, and a controller 530.

The communication unit 510 provides an interface for performing communication with other devices in the network. For example, the communication unit 510 converts a bit string transmitted from the core network device to the other device into a physical signal, and converts a physical signal received from the other device into a bit string. For example, the communication unit 510 may transmit and receive signals. Accordingly, the communication unit 510 may be referred to as a modem, a transmitter, a receiver, or a transceiver. In this case, the communication unit 510 enables the core network device to communicate with other devices or systems via a backhaul connection (e.g., a wired backhaul or a wireless backhaul) or over a network.

The storage 520 stores data, such as basic programs, application programs, and configuration information for the operation of the core network device. The storage 520 may include a volatile memory, a non-volatile memory, or a combination of a volatile memory and a non-volatile memory. The storage 520 provides the stored data according to a request of the controller 530.

The controller 530 controls the general operation of the core network device. For example, the controller 530 transmits and receives signals through the communication unit 510. Further, the controller 530 records data in the storage 520, and reads data from the storage 520. To this end, the controller 530 may include at least one processor. According to various embodiments of the disclosure, the controller 530 may be configured to control the device to perform operations according to various embodiments described in the disclosure.

Figure 6:
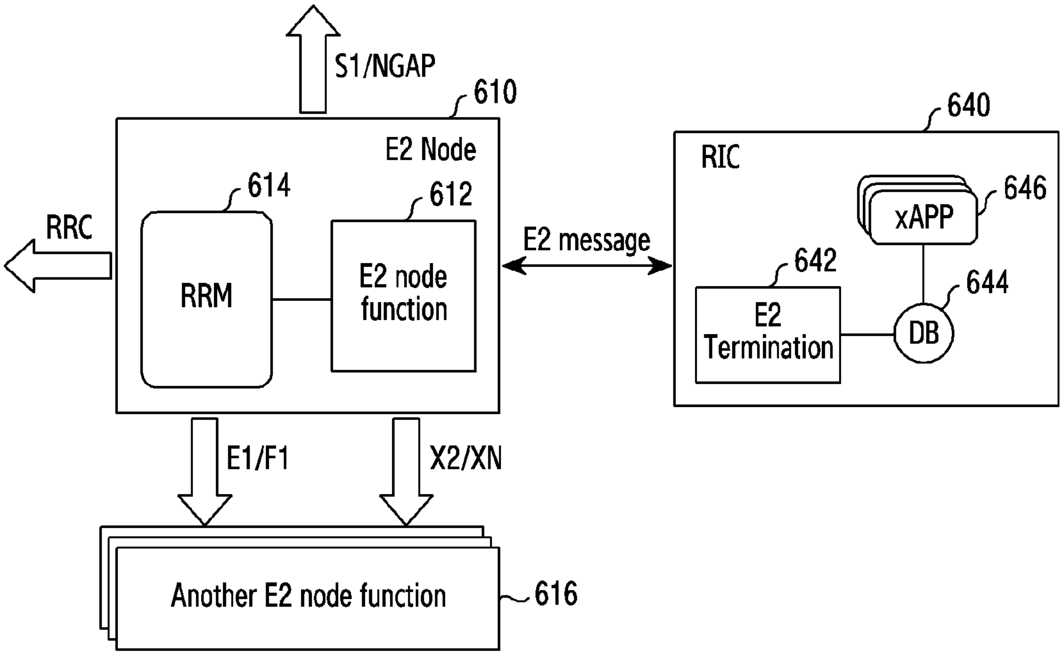
FIG. 6 illustrates logical functions related to an E2 message for an E2 node and a RIC in a radio access network according to an embodiment of the disclosure.

FIG. 6 illustrates logical functions related to E2 messages for an E2 node and RIC in a radio access network according to an embodiment of the disclosure.

Referring to FIG. 6, an RIC 640 and an E2 node 610 may transmit or receive an E2 message to each other. For example, the E2 node 610 may be an O-CU-CP, O-CU-UP, O-DU, or a base station. The communication interface of the E2 node may be determined according to the type of the E2 node 610. For example, the E2 node 610 may communicate with another E2 node 616 through an E1 interface or an F1 interface. Alternatively, the E2 node 610 may communicate with the E2 node 616 through an X2 interface or an XN interface, for example. Alternatively, the E2 node 610 may perform communication through an S1 interface or a next generation application protocol (NGAP) interface (i.e., an interface between a next generation (NG) RAN node and an AMF), for example.

The E2 node 610 may include an E2 node function 612. The E2 node function 612 is a function corresponding to a particular xApp (application software (S/W)) 646 installed in the RIC 640. For example, in the case of a KPI monitor, KPI monitor collection S/W may be installed in the RIC 640, and the E2 node 610 may include an E2 node function 612 that generates KPI parameters and then forwards an E2 message including KPI parameters to an E2 termination 642 located at the RIC 640. The E2 node 610 may include a radio resource management (RRM) 614. The E2 node 610 may manage the resources provided to the radio network for the terminal.

The E2 termination 642 located in the RIC 640 is a termination of the RIC 640 of the E2 message, which may perform the function of interpreting the E2 message forwarded by the E2 node 610, and then transmitting the message to the xApp 646. A Database (DB) 644 located in the RIC 640 may be used for the E2 termination 642 or xApp 646. The E2 node 610 shown in FIG. 6 is a termination of at least one interface and may be understood as terminations of messages transmitted to the terminal, a neighboring base station, and a core network.

Figure 7:
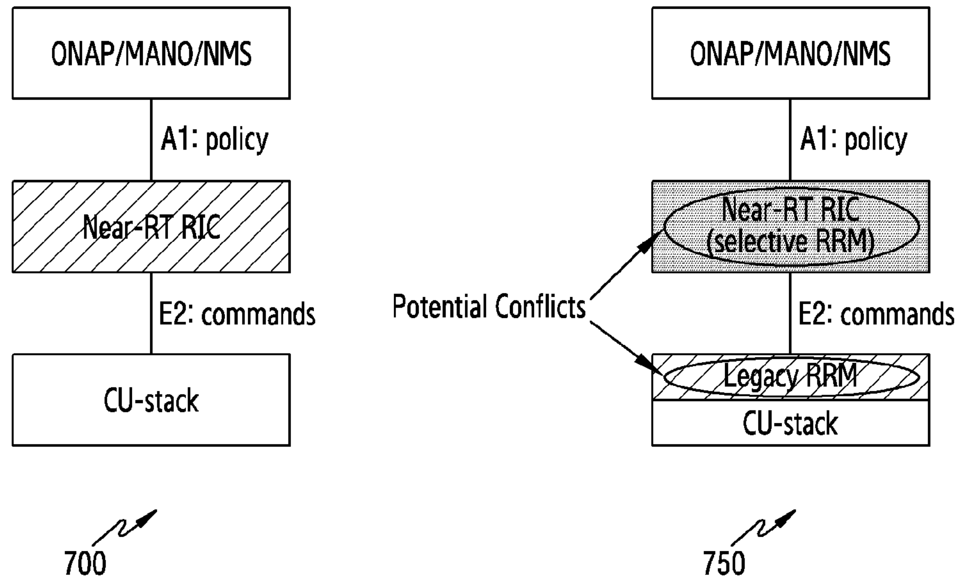
FIG. 7 illustrates function split between an E2 node and a RIC according to an embodiment of the disclosure.

FIG. 7 illustrates function split between an E2 node and a RIC according to an embodiment of the disclosure.

Referring to FIG. 7, the O-RAN specification provides function split between the E2 node and the RIC. For example, the E2 node may be a CU. The RIC may be a near RT RIC. The RIC may be connected to an open network automation platform (ONAP)/management and orchestration (MANO)/network management system (NMS) through an A1 interface. The RIC may be connected to the E2 node through an E2 interface. The E2 interface may transmit commands. The function split option may include a function split 700 that fully manages the radio resource management (RRM) in the near-RT RIC, and a function split 750 that selectively manages the RRM in the near-RT RIC.

According to WG3 decision at the 2019 Jan. 16 meeting, Near-RT RIC will support E2 through an open logical interface targeting multi-vendor environments regardless of implementation of the specific RRC-RRM algorithm located in nRT-RIC. In this disclosure, E2 service model radio interface control (E2SM-RIC) paired with E2SM-NI, which is capable of injecting/modifying/configuring Per UE RRC messages for each interface (I/F) and network entity (NE), may be proposed. In other words, the Near RT RIC may be improved gradually in the direction of the function split 700 from the function split 750. E2 is independent of implementation of the specific RRC-RRM algorithm found in nRT-RIC and may be developed as an open logical interface targeting multi-vendor environments.

Figure 8:
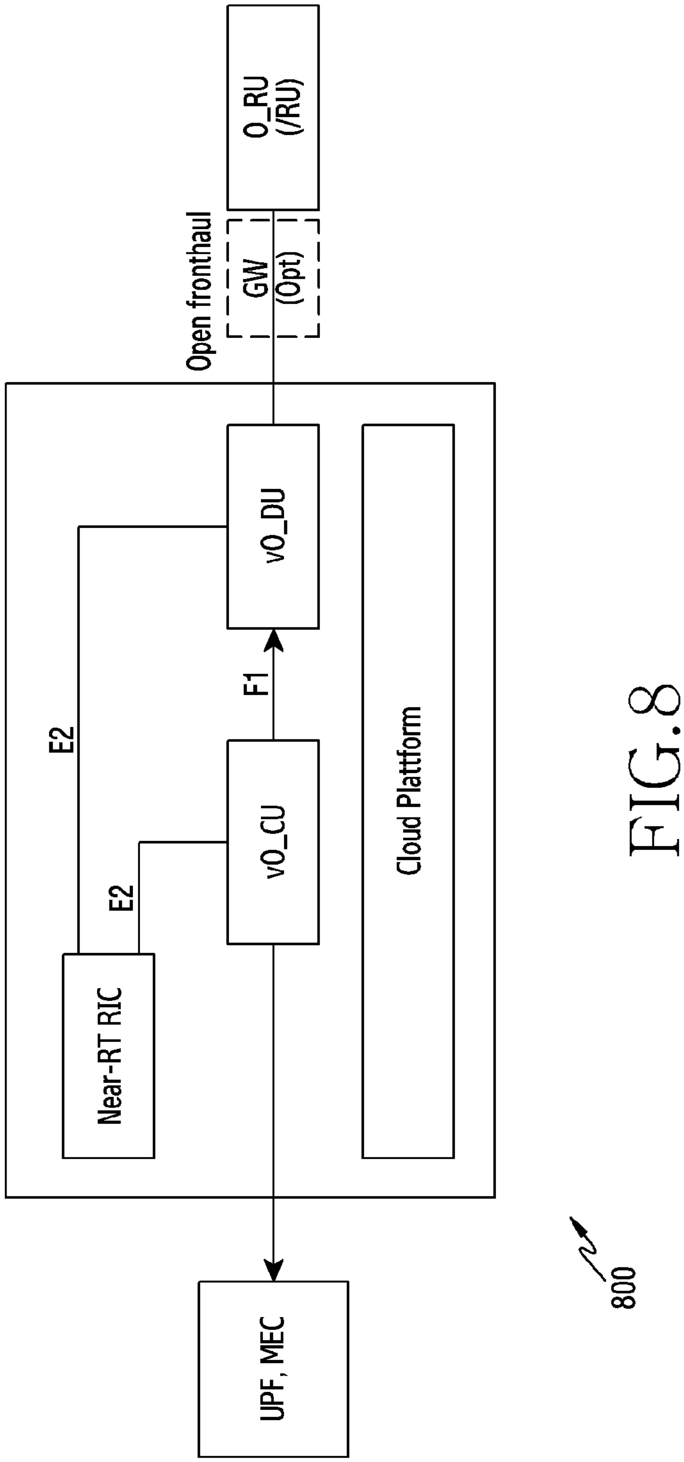
FIG. 8 illustrates an implementation example of an E2 node and a RIC according to an embodiment of the disclosure.

FIG. 8 illustrates an implementation example of an E2 node and RIC according to an embodiment of the disclosure. In the scenario of implementation 800, an E2 node (e.g., O-DU, O-CU) and a RIC may be virtualized on a cloud platform (e.g., open chassis and blade specification edge cloud) and configured on devices (e.g., servers). This scenario may support deployment in densely populated urban areas with abundant fronthaul capacity allowing baseband unit (BBU) functions to be pooled in a central location, with enough low latency to meet O-DU latency requirements. Therefore, it may be unnecessary to attempt to centralize a near-RT RIC beyond the limit up to which O-DU functions can be centralized. According to an embodiment of the disclosure, E2SM-RIC may be optimized for O-RAN deployment scenarios in which Near-RT RIC, O-CU, and O-DU are implemented on O-cloud platform.

Figure 9:
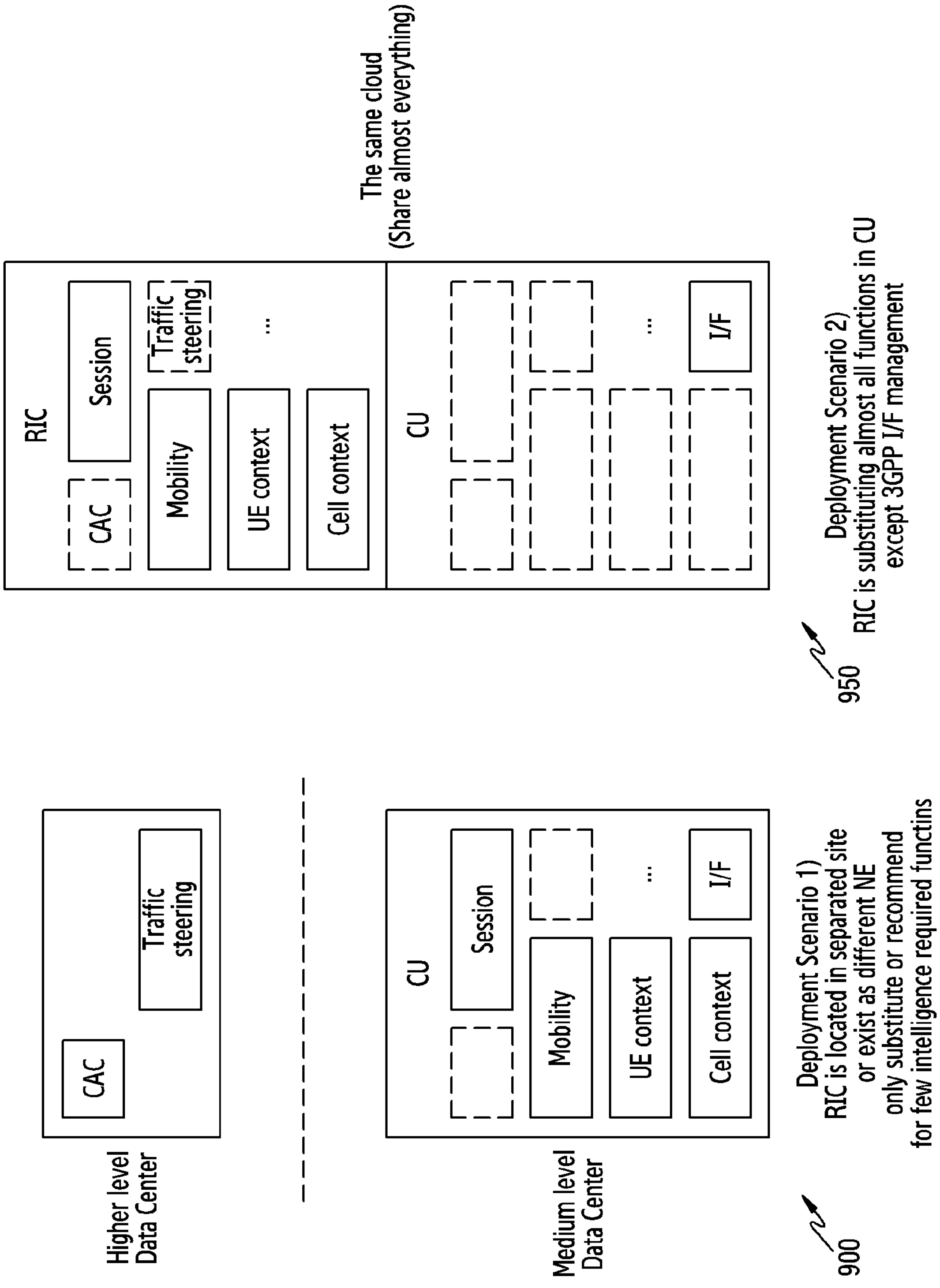
FIG. 9 illustrates function split between a centralized unit (CU) and a RIC according to an embodiment of the disclosure.

FIG. 9 illustrates function split between a centralized unit (CU) and a RIC according to an embodiment of the disclosure.

Referring to FIG. 9, function splits may be performed according to deployment scenario #1 900 or function deployment scenario #2 950.

Deployment Scenario #1 900: RIC is located in a separated site or only exist as a different NE, and substitutes or recommends some intelligence essential functions.

Deployment Scenario #2 950: RIC may substitute almost all functions of CU except for 3GPP I/F management.

Although two scenarios are shown in FIG. 9, other scenarios may be applied. As an example, in deployment scenario #1 900, a mobility function may be performed by the RIC rather than the CU. In addition, as an example, in deployment scenario #1 900, a UE context function may be performed by the RIC rather than the CU. Furthermore, as an example, in deployment scenario #1 900, a session establishment function may be performed by the RIC rather than the CU.

Figure 10:
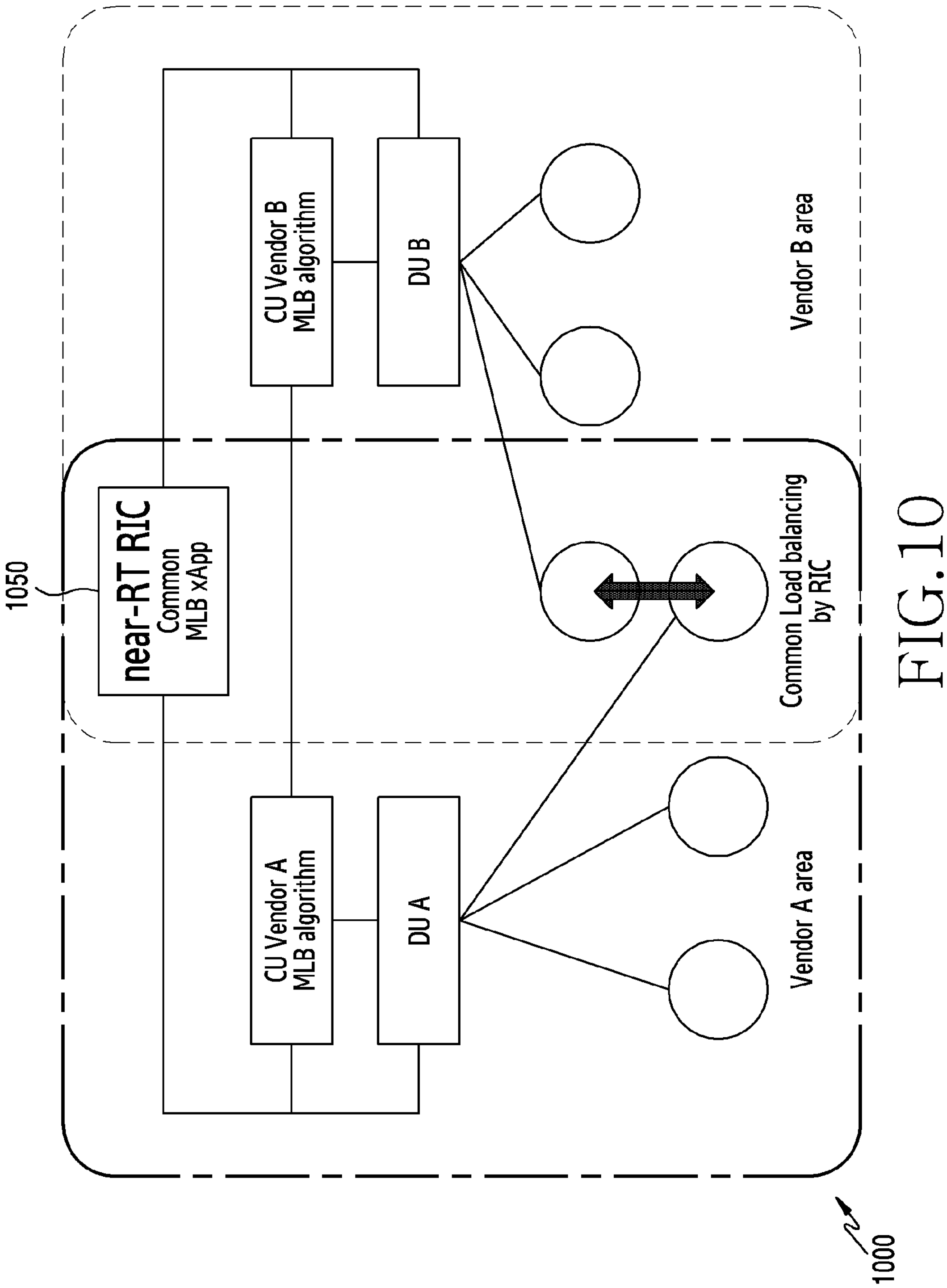
FIG. 10 illustrates a mobility load balancing (MLB) control for different vendors according to an embodiment of the disclosure.

FIG. 10 illustrates mobility load balancing (MLB) control for different vendors according to an embodiment of the disclosure.

Referring to FIG. 10, such MLB may be performed by RRM control as illustrated in elements 1000 and 1050. A first CU and a first DU may be provided by vendor A. A second CU and a second DU may be provided by vendor B. The first DU may provide a service area of vendor A. RUs connected to the first DU may provide a service area of vendor A. The second DU may provide a service area of vendor B. The RUs connected to the second DU may provide a service area of the vendor B.

During UE movement, determination as for which cell is optimal may be performed through load balancing. If such load balancing is performed by different vendors, load balancing may be difficult to be smoothly performed in a space where service areas of the vendors overlap. For example, it is required to perform interworking between vendors in an inter vendor zone or an inter CU-CP area. For interworking between these vendors, RRM control may be required to be performed in a centralized form. Accordingly, a RIC according to various embodiments of the disclosure may be configured to perform RRM. The RIC may generate messages to control each E2 node, as well as simply receive measurements from each E2 node. The RIC may transmit a control message to each E2 node (e.g., DU, CU-CP, CU-UP).

Figure 11A:
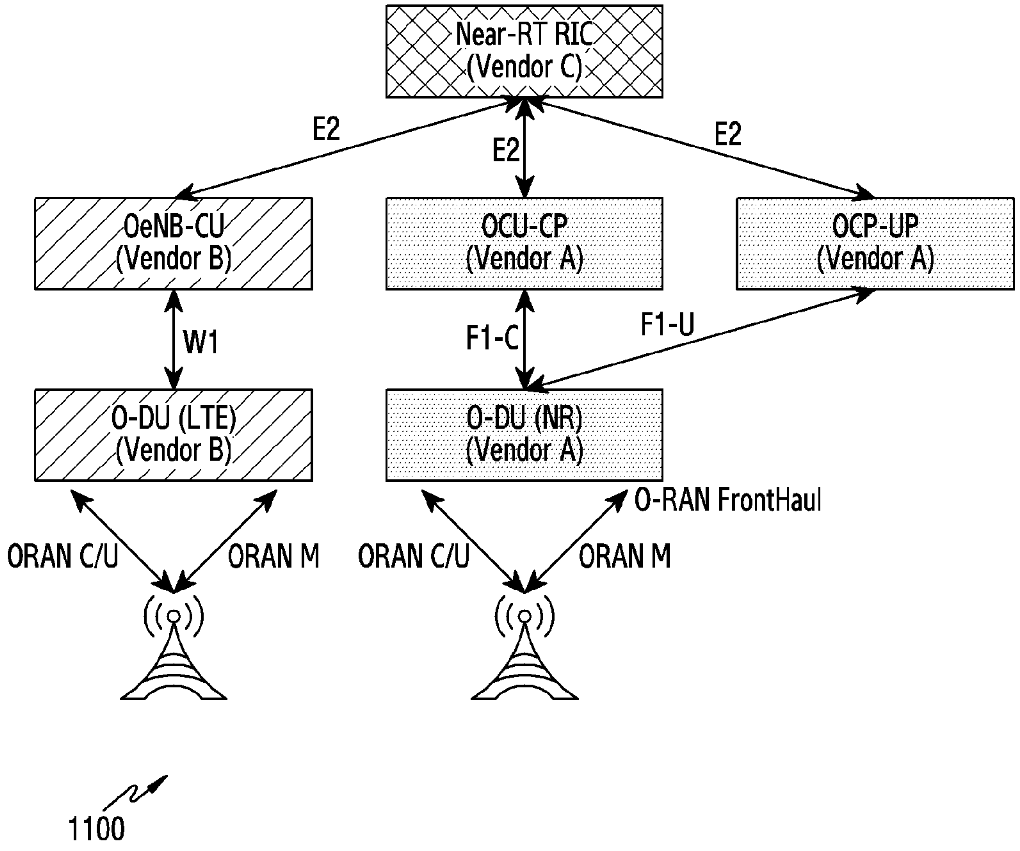
FIG. 11A illustrates MLB control for different vendors according to an embodiment of the disclosure.

FIG. 11A illustrates MLB control for different vendors according to an embodiment of the disclosure. First, unlike shown in FIG. 11A, when operating as a single vendor, an RAN context may be identified in a near-RT RIC. In addition, trigger event/REPORT, INSERT, POLICY conditions may be activated. A control action also work, and the general sub-function definition approach may work as well. However, as shown in FIG. 11A, when operating as multiple vendors, the RAN context is unable to be identified in the near-RT RIC. in addition, trigger event/REPORT, INSERT, and POLICY conditions do not work. The control action does not work or has to depend on the implementation due to the conflict of local RRMs.

A single E2SM-RAN control is difficult to operate properly in an O-RAN situation in a multi-vendor environment. This is because, when considering all RAN features, there are a function parity and an operation parity. A RAN function parity implies a difference in features related to RRM functions (e.g., quality of service (QoS) handover, load balancing (LB) handover, or the like). A RAN operation parity implies a difference in features related to RAN operations (e.g., EN-DC SCG bearer change procedure). In addition, the operations for REPORT/INSERT/CONTROL/POLICY are unable to identify the correct RAN CONTEXT. Furthermore, REPORT/INSERT/CONTROL/POLICY operations are unable to identify trigger events/conditions according to REPORT/INSERT/POLICY. In addition, in the corresponding operation, the RAN context may be difficult to be referred to in a specific deployment.

Referring to FIG. 11A, a wireless communication environment 1100 illustrates network entities configured through a total of three vendors. Vendor A may be an NR supplier. Vendor B may be an LTE supplier. Vendor C may be a RIC supplier. In order to solve the above-mentioned problems, even if E2 node of any vendor is connected, one entity that can manage all of E2 nodes is required. Since the near-RT RIC may collect all measurement information even from different vendors, the near-RT RIC may perform management and control more easily than other entities. Accordingly, differences and compatibility issues between vendors can be resolved by performing RRM in a centralized manner by the near-RT RIC. In addition, even if they are different RATs, differences and compatibility problems between vendors can be resolved.

Hereinafter, in the disclosure, the centralized RRM by the near-RT RIC may be referred to and described as terms, such as RIC-based RRM control or zombie mode of E2 node, zombie mode of E2SM-RIC, and E2SM-RIC-dedicated mode. The technical meaning of performing the function of each E2 node by the RIC can be used instead of the terms exemplified above.

Figure 11B:
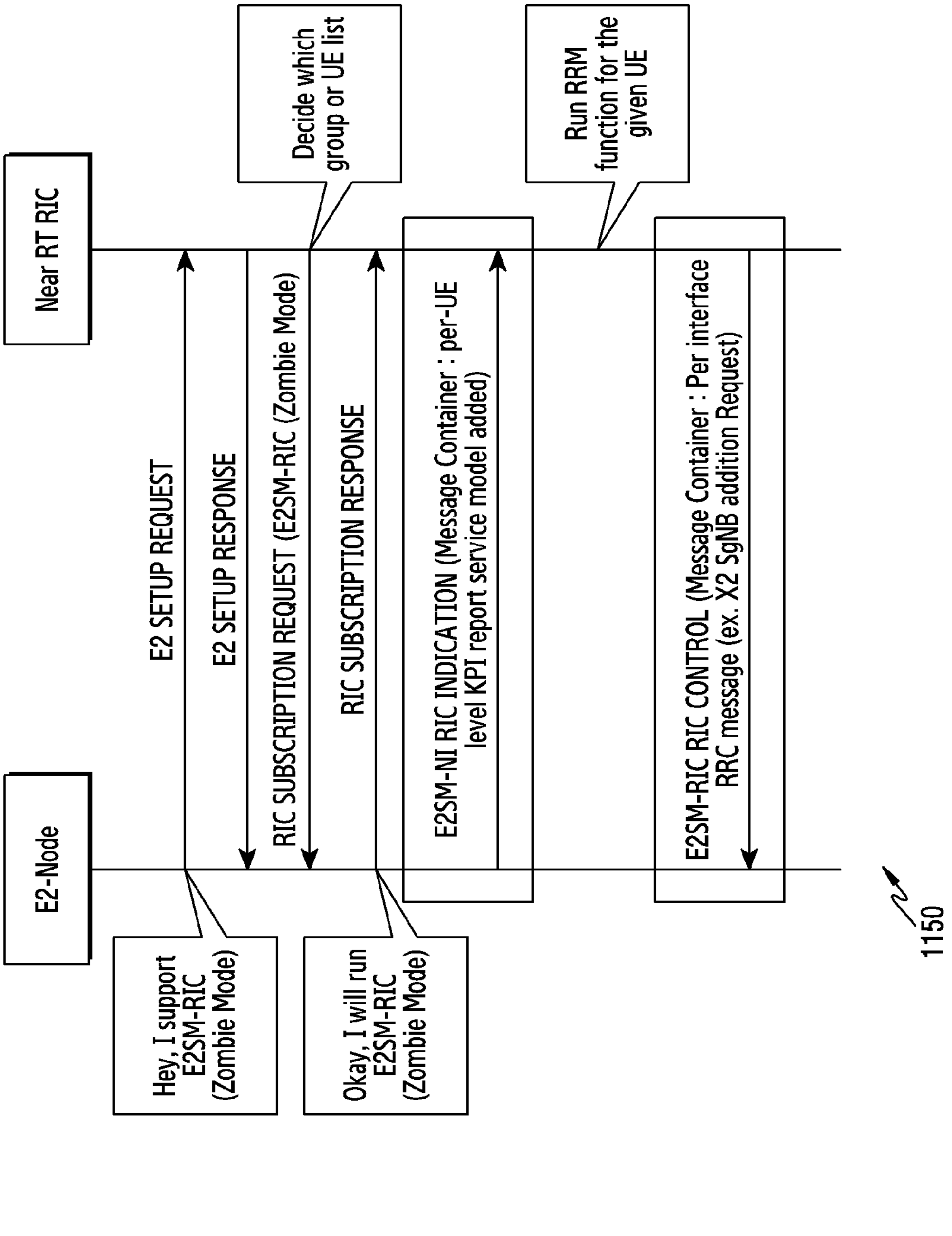
FIG. 11B illustrates signaling for radio resource management (RRM) control setting of a near-RT RIC according to an embodiment of the disclosure.

FIG. 11B illustrates signaling 1150 for RRM control configuration of a near-RT RIC according to an embodiment of the disclosure. FIG. 11B illustrates a signaling procedure between an E2 node and a RIC. Specifically, FIG. 11B shows a setup procedure of E2 I/F between an E2 node and a RIC and a procedure of transferring a RIC subscription message. Further, in FIG. 11B, a procedure of transferring the RIC indication message and the RIC control message is illustrated.

Referring to FIG. 11B, an E2 node may transmit an E2 setup request message to a RIC. An E2 NODE FUNCTION function located in the E2 node may find a RIC by using a RIC IP address configured through operation-administration-maintenance (OAM) and transmit the E2 setup request message. Here, the E2 node may request RIC-based RRM control. For example, the E2 node may transmit an E2 setup request message including the fact that the E2 node is operable as a zombie mode to the RIC. In a subsequent operation, the RIC may receive an E2 setup response message from the E2 node. The RIC may determine, from the E2 node, whether the E2 node supports a zombie mode, that is, whether full RRM control by the RIC is possible.

Referring to FIG. 11B, the RIC may transmit a subscription request (RIC SUBSCRIPTION REQUEST) message to the E2 node. A particular xApp located in the RIC requests the RIC E2 terminal function to join (or subscribe) to the particular RAN function definition function supported by E2. According to an embodiment of the disclosure, the subscription request message may include information for indicating whether the RIC performs RIC-based RRM control. For example, the subscription request message may include information for indicating whether the RIC operates as an E2SM-RIC. In addition, for example, the RIC may transmit a subscription request message including a zombie mode indicator. According to an embodiment of the disclosure, RIC-based RRM control may be performed in units of UE or a UE group including UEs. RIC-based RRM control may be performed for a terminal located in an area between vendors or a common service area of CU-Ups, or a group including the terminal, as shown in FIGS. 10 and 11A. In this case, the subscription request message may include an ID indicating a group (hereinafter, group identifier) or an ID for indicating a particular terminal (hereinafter, terminal ID/UE ID).

According to an embodiment of the disclosure, as shown in FIG. 7, the transmission of the subscription request message and the E2 setup response message may be transmitted separately. According to another embodiment of the disclosure, the subscription request message of the step may be transmitted together by being included in the E2 setup response message of the step.

In a subsequent operation, the E2 node may transmit a subscription request response (RIC SUBSCRIPTION RESPONSE) to the RIC. The E2 node function of the E2 node may decode the subscription request message. The E2 node may identify whether the RIC is an E2SM RIC. The E2 node may identify whether the RIC operates in a zombie mode or whether zombie mode operation of the E2 node is allowed or not.

Referring to FIG. 11B, the E2 node may transmit an E2 RIC indication message to the RIC. The E2 node and the RIC may perform a RIC indication procedure. According to embodiments of the disclosure, the RIC indication message may include a KPI report in units of UE. According to an embodiment of the disclosure, a message container of the RIC indication message may include a KPI reporting service model in units of UE. Thereafter, the RIC may perform RRM for the corresponding UE. Although not shown in FIG. 11B, the RIC may perform RRM and generate a control message including specific information related to a resource allocation procedure. Accordingly, the RIC may control each E2 node.

An E2SM RIC control message may be transmitted to the E2 node 610. The E2 node 610 and the RIC 640 may perform a RIC control procedure. The RIC 640 may generate an E2SM-RIC RIC control message for a control procedure of the E2 node. As an example, the E2SM-RIC RIC control message may include a message container. The message container may include interface-specific RRC messages (e.g., an X2 SgNB addition request message).

Although description is made in units of UE in FIG. 11B, measurement may be performed and reported, and RIC control may be performed, in various units, such as a group of UEs/network slice.

Referring to FIG. 11B, the SET UP procedure, the RIC subscription procedure, the RIC indication message transmission procedure, and the RIC control message transmission procedure have been sequentially described, but various embodiments of the disclosure are not limited to the above-described sequence and procedure. For example, in some embodiments of the disclosure, the E2 node and the RIC may independently perform the E2 configuration procedure. In some embodiments of the disclosure, the E2 node and the RIC may independently perform the subscription procedure. Meanwhile, according to another embodiment of the disclosure, as described above, the E2 setup response message may include a subscription request message. In some embodiments of the disclosure, the E2 node and the RIC may independently perform the RIC indication procedure. Further, in some embodiments of the disclosure, the E2 node and the RIC may independently perform the RIC control procedure. In addition, the E2 node and the RIC may perform at least some of the above-described procedures together or separately.

For RIC-based RRM, the RIC may instead process a message that the E2 node should process. The RIC may instead generate a control message that is generated by the processing of the E2 node and should be delivered to another node or UE. This control message may include various types of messages. According to an embodiment of the disclosure, the control message may be a message defined to be transmitted between nodes (e.g., between CU-DUs, between DU-RUs, or between CU-CPs/CU-UPs). For example, processing according to the request may be performed by the RIC instead of the E2 node. The RIC may process the request and generate a response. The RIC may provide the generated response back to the E2 node. In addition, according to an embodiment of the disclosure, the control message may be a message for UE configuration (e.g., RRC-related configuration). For example, the control message may include a measurement configuration/measurement report to be configured for the UE by the DU (or via the RU). The RIC may generate an RRC configuration for the UE and deliver the RRC configuration to the UE through the DU/RU. For example, in an RRM procedure by a RIC to be described in the disclosure, the message generated by the RIC may include at least one of messages for various uses, such as control/report/configuration/setup between entities of FIG. 4 or for UE.

Figure 12A:
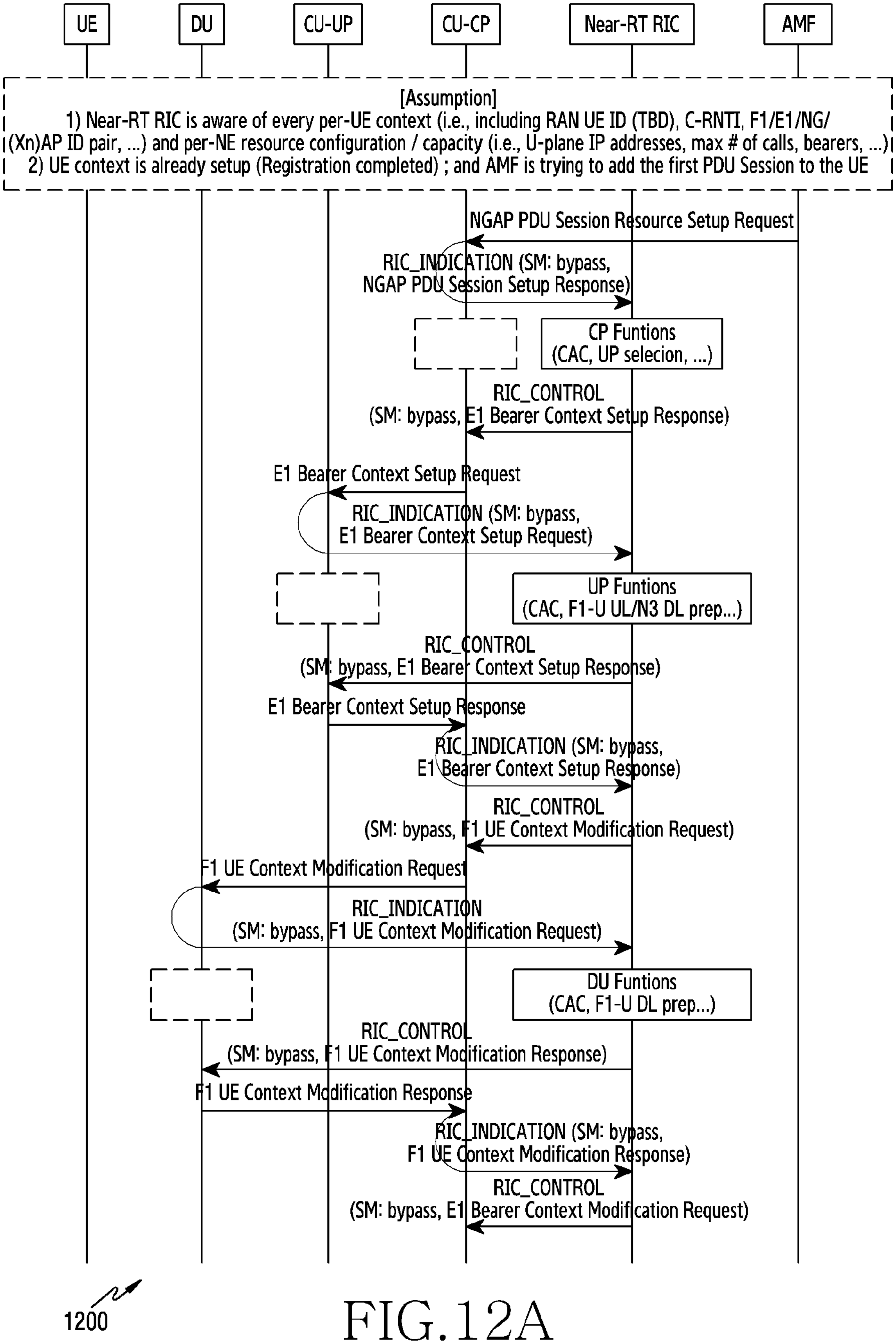
FIGS. 12A and 12B illustrate signaling for RIC-based RRM control according to various embodiments of the disclosure.
Figure 12B:
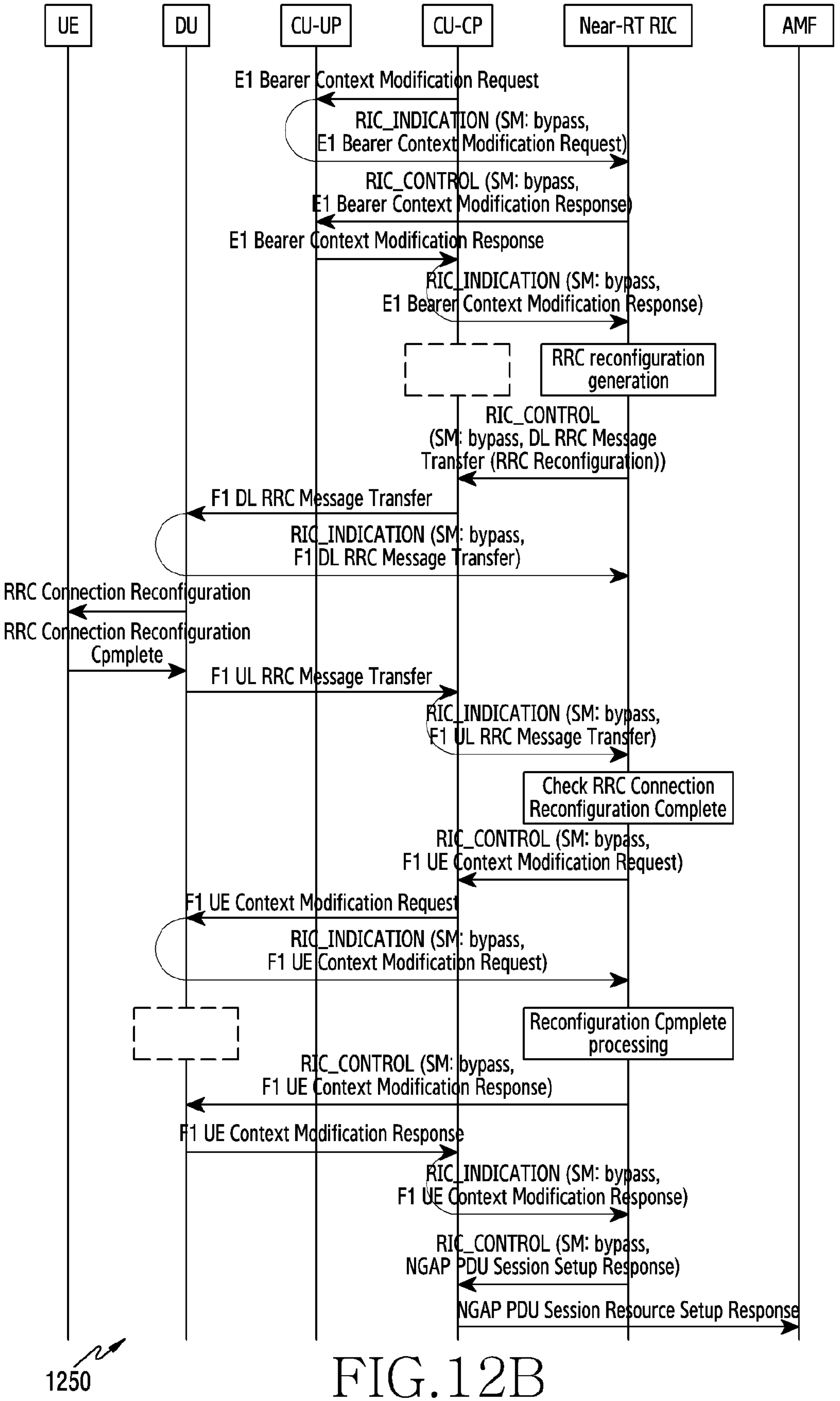

FIGS. 12A and 12B illustrate signaling 1200 and 1250 for RIC-based RRM control according to various embodiments of the disclosure. Load balancing (e.g., MLB) between different vendors is performed through RRM control. Although illustrated as a single E2 node in FIGS. 12A and 12B, load balancing may be equivalently applied to a plurality of E2 nodes, particularly between E2 nodes having different vendors. Even if the vendors are different, RRM control may be more efficiently performed through the control by the RIC.

Referring to FIGS. 12A and 12B, the RIC may process the following messages/procedures to perform the functions of the E2 node instead.

(1) NGAP PDU Session Resource Setup Request
(2) E1 bearer Context Setup Request
(3) E1 bearer Context Setup Response
(4) F1 UE Context Modification Request
(5) F1 UE Context Modification Response
(6) E1 Bearer Context Modification Request
(7) E1 Bearer Context Modification Response
(8) DL RRC Message Transfer
(9) F1 UE RRC Message Transfer
(10) F1 UE Context Modification Request
(11) F1 UE Context Modification Response
(12) NGAP PDU Session Resource Setup Response When the AMF transmits a message to the E2 node, the E2 node may forward the message to the RIC. For example, in order for the RIC to perform interpretation/processing/determination of the corresponding message, the E2 node may be bypassed to allow the corresponding message to be delivered to the RIC. The blanks shown in FIGS. 12A and 12B imply that the near-RT RIC instead performs a function that should have been performed by each existing E2 node. In the RIC, an intelligence-aided function may be improved to perform operations for RRM, such as message interpretation/processing/determination.

Although FIGS. 12A and 12B are shown in the order of passage of time, this is only for explaining the operation of E2SM-RIC according to various embodiments of the disclosure, and does not imply that a specific signaling should be performed, as an essential element, before other signaling. For example, according to another embodiment of the disclosure, some of the procedures illustrated in FIGS. 12A and 12B may be omitted. According to another embodiment of the disclosure, some signaling may be performed by the RIC at a time. In addition, although processing of the messages of (1) to (12) is illustrated in FIGS. 12A and 12B, embodiments of the disclosure are not limited thereto. Some of the above-described examples may be interpreted/determined/processed by the RIC, but others may be performed by the E2 node as before.

Hereinafter, examples of control messages of a RIC (i.e., E2SM-RIC or RIC for RRM control) according to embodiments of the disclosure will be described with reference to FIGS. 13, 14A to 14F, and 15.

Figure 13:
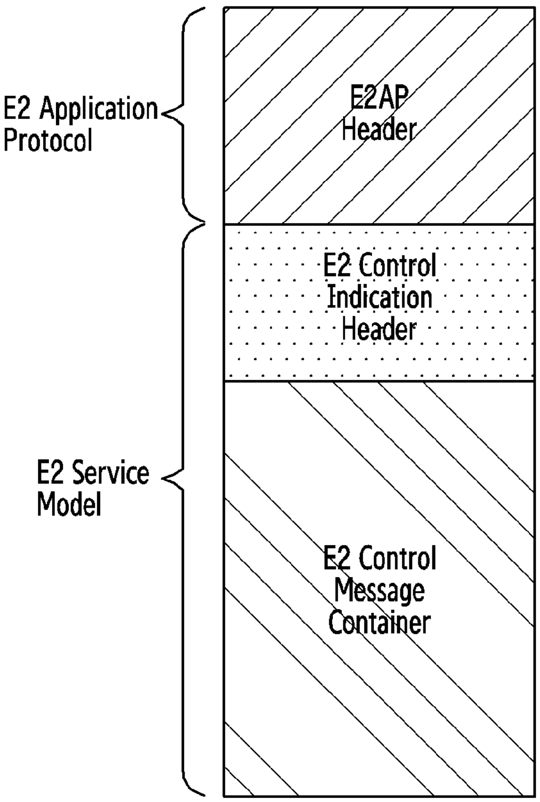
FIG. 13 illustrates an E2 control message supported by an O-RAN E2 service model used in an E2 service model (E2SM)-RIC according to an embodiment of the disclosure.

FIG. 13 illustrates an E2 control message supported by an O-RAN E2 service model used in an E2SM-RIC according to an embodiment of the disclosure.

Referring to FIG. 13, the E2 control message may largely include an E2AP header and an E2 service model. The E2AP header specifies a message code value that the E2 message is a control message. The E2 Control message is located in the E2 service model. The E2 control message includes an E2 control indication message and an E2 control message container message.

FIG. 14A illustrates an E2SM control header supported by an O-RAN E2 service model used in an E2SM-RIC according to an embodiment of the disclosure.

Referring to FIG. 14A, this is only for explaining the operation of E2SM-RIC according to various embodiments of the disclosure, and does not imply that a specific signaling should be performed, as an essential element, before other signaling. A detailed description of the IEs shown in FIG. 14A is described with reference to FIGS. 14B to 14F.

FIG. 14B illustrates a network interface type of an E2SM control header supported by an O-RAN E2 service model used in an E2SM-RIC according to an embodiment of the disclosure.

Referring to FIG. 14B, the network interface type defined here is the same as the network interface type used in the 3GPP and O-RAN. The network interface type may include an S1 interface, an X2 interface, an NG interface, an F1 interface, an E1 interface, and the like.

FIG. 14C illustrates a network interface identifier of an E2SM control header supported by an O-RAN E2 service model used in an E2SM-RIC according to an embodiment of the disclosure.

Referring to FIG. 14C, the network interface identifier defined here is the same as the network interface identifier used in the 3GPP and O-RAN.

FIG. 14D illustrates O-RAN UE ID of an E2SM control header supported by an O-RAN E2 service model used in an E2SM-RIC according to an embodiment of the disclosure.

Referring to FIG. 14D, the O-RAN UE ID has an integer value and may be used to control a radio resource management (RRM) message by being limited to a specific UE in the operation of E2SM-RIC.

FIG. 14E illustrates a RAN UE group ID in the E2SM control header supported by an O-RAN E2 service model used in an E2SM-RIC according to an embodiment of the disclosure.

Referring to FIG. 14E, the RAN UD Group ID may be used to control a Radio Resource Management (RRM) message by limiting to a specific group in the operation of E2SM-RIC according to the same integer value as the RAN UE group ID used in 3GPP and O-RAN.

FIG. 14F illustrates a RIC control message priority of an E2SM control header supported by an O-RAN E2 service model used in an E2SM-RIC according to an embodiment of the disclosure.

Referring to FIG. 14F, the RIC control message priority indicates the priority of another control message by using the same integer value as that of the RIC control message priority used in the O-RAN, and is used to control the priority of radio resource management (RRM) messages by being limited to messages within a specific group or specific UE in the operation of E2SM-RIC.

FIG. 15 illustrates a network interface message container located in a message body indicated by an E2SM control header supported by an O-RAN E2 service model used in an E2SM-RIC according to an embodiment of the disclosure.

Referring to FIG. 15, this has the same octet string value as that of the network interface message used in O-RAN.

FIG. 16 illustrates a radio control interface located in a message body indicated by an E2SM control header supported by an O-RAN E2 service model used in an E2SM-RIC according to an embodiment of the disclosure.

Referring to FIG. 16, the radio control interface may include at least one of "radio control interface message type", "RAT Type", "O-RAN UE ID", "RAN UE group ID", or "RIC Control message priority". "M" stands for mandatory and 'O' stands for optional. The radio control interface message type defines the types of RRC messages delivered between a base station and a UE defined in the 3GPP. For example, the type of RRC messages may include RRC connection reconfiguration or RRC connection re-establishment. RAT type is a type of radio access technology (RAT), and defines LTE or NR. The O-RAN UE ID is a unique ID of a UE managed by the near-RT RIC, associated with cell radio network temporary identifier (C-RNTI) or temporary mobile subscriber identity (TMSI), globally unique temporary ID (GUTI), or the like, managed by a base station. The RAN UE GROUP ID is an ID of a service group to which a UE belongs, allocated by an access and mobility management function (MME/AMF). For example, the RAN UE GROUP ID may include service profiling identity (SPID) and/or radio access type/frequency of selection priority (RFSP). The RIC control message priority indicates the priority of message processing when the base station receives a radio control interface message from the near-RT RIC with respect to the same UE.

FIG. 17 illustrates delivery of downlink control information (DCI) through a message body indicated by an E2SM control header supported by an O-RAN E2 service model used in an E2SM-RIC according to an embodiment of the disclosure. The table in FIG. 17 is an example in which a per UE DCI control message container is introduced to utilize DCI, which is a control parameter of a physical layer of a UE, in addition to the above-described examples. As a message for indicating DCI, such as "per UE DCI control message container", a network interface message container located in the message body indicated by the E2SM control header supported by the RAN E2 service model used in the E2SM-RIC described above, as shown in the table in FIG. 16, may be exemplified.

Referring to FIG. 17, "M" stands for mandatory and "O" stands for optional. "Control Interface message type", "RAT type", "O-RAN UE ID", "RAN UE group ID", and "RIC control message priority" included in the control message are the same as or similar to the description in FIG. 16. The radio control interface message type defines the types of RRC messages transmitted between a base station and a UE, defined in 3GPP. For example, the type of RRC messages may include RRC connection reconfiguration or RRC connection re-establishment. The RAT type is a type of radio access technology (RAT), and defines LTE or NR. The O-RAN UE ID is a unique ID of a UE managed by the near-RT RIC, associated with C-RNTI or TMSI, GUTI, or the like, managed by a base station. The RAN UE GROUP ID is an ID of a service group to which a UE belongs, allocated by an access and mobility management function (MME/AMF). For example, the RAN UE GROUP ID may include a service profiling identity (SPID) and/or a radio access type/frequency of selection priority (RFSP). The RIC control message priority indicates the priority of message processing when the base station receives a radio control interface message from the near-RT RIC with respect to the same UE.

A data radio bearer (DRB) ID implies an ID of a data radio bearer allocated to a UE. In the corresponding DCI control message container, a DCI format type in LTE and/or NR may be designated. In addition, related DCI may be encapsulated in the DCI container. Accordingly, the RIC may generate a DCI message suitable for each RAT type for each UE. The RIC may directly generate the DCI message and perform power control or PHY level control, such as UE-specific resource block (RB) quota control and modulation and coding scheme (MCS) setup. According to an embodiment of the disclosure, the RIC may provide predicted scheduling information (e.g., MCS, RB resource allocation), and the like to the DU. As an example of an operation, the DU may perform scheduling based on information transmitted from the RIC. The RIC may perform scheduling based on information transmitted from the RIC and channel information (e.g., channel state information (CSI)) obtained from the UE.

An E2 node may support various services. As shown in FIG. 11B, the E2 node may notify of a service supported by the E2 node through a setup request. For example, the setup request message of the E2 node (i.e., E2 SETUP REQUEST) may be configured as follows.

This message is sent by an E2 Node to a Near-RT RIC to transfer the initialization information.

Direction: E2 Node→Near-RT RIC

TABLE 1

| IE/Group Name | Presence | Range | IE type and reference | Semantics description | Criticality | Assigned Criticality |
|---|---|---|---|---|---|---|
| message type | M | | 9.2.3 | | YES | reject |
| Global E2 Node ID | M | | 9.2.6 | | YES | reject |
| List of RAN Functions Added | | 0 . . . <maxofRAN functionID> | | | YES | reject |

TABLE 1-continued

| IE/Group Name | Presence | Range | IE type and reference | Semantics description | Criticality | Assigned Criticality |
|---|---|---|---|---|---|---|
| >RAN Function ID | M | | 9.2.8 | Id of the declared Function | — | |
| >RAN Function Definition | M | | 19.2.23 | Definition of Function | — | |
| >RAN Function Revision | M | | 9.2.24 | Revision counter | — | |

Here, as an example, the RAN function definition of the E2 node may be configured as follows.

This information element carries the RAN function Definition.

TABLE 2

| IE/Group Name | Presence | Range | IE type and reference | Semantics Description |
|---|---|---|---|---|
| RAN Function Definition | M | | OCTET STRING | Defined in RAN Function specific to E2 service Model[3] |

For example, in the setup request process, the E2 node may refer to the E2 service model in order to notify the RIC of a supportable RAN function. To this end, messages to be described later are defined. The E2 node may transmit a message of a type according to embodiments to be described later in order to indicate a supportable service type (i.e., RIC service style) to the RIC. The description of the setup request message may be applied to other messages having the same technical meaning, such as an update message (i.e., RIC service update) and a modification request message, in the same and similar manner.

FIG. 18 illustrates delivery of a RIC service style supported by an O-RAN E2 service model according to an embodiment of the disclosure. The RIC service style shown in FIG. 18 may be delivered in a flat format.

Referring to FIG. 18, the RIC service style may be indicated in the form of an index. A unique index may be defined for each service style. Names of services and indexes corresponding to the services shown in FIG. 18 are not to be construed as limiting the embodiments of the disclosure. The index of the RIC service style may indicate the followings.

0: DRB QoS Modification: Service used to modify QoS of data radio bearer (DRB)

1: QoS Flow to DRB mapping update: Service for updating QoS flow and DRB mapping 2: Logical Channel Reconfiguration: Service for reconfiguration of Logical channel configuration 3: Radio Bearer Admission Control: Service for controlling radio bearer admission 4: Discontinuous reception (DRX) Configuration: Service for discontinuous reception (DRX) configuration 5: Scheduling Request Configuration: Service for configuring a scheduling request 6: Intra-DU Handover; Handover within DU. Although cell change occurs, the same DU may be used.

7: Inter-DU Intra-CU Handover: Inter-DU handover. Although DU change occurs, the same CU may be used. One or more DUs may be connected to a CU.

8: Inter-CU Handover: Inter-CU handover. CU change may occur.

9: CU-UP relocation handover: Handover by which CU-UP is reassigned

10: DCI configuration update: Update DCI configuration

11: AMBR configuration update: Update aggregate maximum bit rate (AMBR) configuration Although 11 examples have been described in FIG. 18, embodiments of the disclosure are not limited thereto. According to an embodiment of the disclosure, at least some of the examples shown in FIG. 18 may be defined by being formatted and indexed. According to another embodiment of the disclosure, in addition to the examples shown in FIG. 18, other types of services may be added and each service may be indexed.

FIG. 19 illustrates a message format for RIC service style supported by an O-RAN E2 service model according to an embodiment of the disclosure. "M" stands for mandatory and "O" stands for optional.

Referring to FIG. 19, the message may include a RIC function name. The message may include a RIC service style list (RIC service style list). The RIC service style list may include a list of one or more supportable RIC service styles. An index of a RIC service style that can be supported through each item in the RIC service style list may be delivered from the E2 node to the RIC. The RIC may identify a predefined RIC service style as shown in the table in FIG. 18 through the index. Although not shown in FIG. 19, the RIC may transmit a RIC control message to the E2 node based on the information obtained through FIGS. 18 and 19. The RIC control message may include a configuration for a corresponding service. The service included in the RIC control message may be service model-specific of E2SM.

FIG. 20 illustrates delivery of a RIC service style supported by an O-RAN E2 service model according to an embodiment of the disclosure. The RIC service style shown in FIG. 20 may be delivered in a categorized format.

Referring to FIG. 20, the RIC service style may be indicated in the form of an index. Unlike FIG. 18, the RIC service style may be indicated together with a specific category instead of being directly indicated through the index of the RIC service style. A service category is first defined through the category, and each service within the category may be indicated by an index. Category names, service type names, and indexes corresponding to service types illustrated in FIG. 20 are not to be construed as limiting the embodiments of the disclosure.

The services illustrated in FIG. 20 may be categorized as follows.

1) Radio Bearer Control

This implies a category for services related to radio bearer control serviced by the E2 node. A service style supportable in a corresponding category may be exemplarily defined as follows.

#0: DRB QoS Modification

#1: QoS Flow to DRB mapping update

#2: Logical Channel Reconfiguration

#3: Radio Bearer Admission Control

2) Mobility Control

This refers to a category for services related to the mobility control of the UE, such as handover, mobility management, and radio resource management (RRM). A service style supportable in a corresponding category may be exemplarily defined as follows.

#0: Intra-DU Handover

#1: Inter-DU Intra-CU Handover

#2: Inter-CU Handover

#3: CU-UP relocation handover

Although two categories have been described as examples in FIG. 20, embodiments of the disclosure are not limited thereto. According to an embodiment of the disclosure, an additional category may be defined in addition to the categories shown in FIG. 20. In addition, according to an embodiment of the disclosure, a category may be defined in a manner different from the categories shown in FIG. 20. As an example, categories may be distinguished according to whether the type of E2 node is DU, CU-UP, or CU-UP. According to an embodiment of the disclosure, the category of services may be referred to as a RIC control service style. Within the corresponding category, the RIC control service may be referred to as a control action.

FIG. 21 illustrates a message format for RIC service style supported by an O-RAN E2 service model according to an embodiment of the disclosure. "M" stands for mandatory and "O" stands for optional.

Referring to FIG. 21, the message may include a RIC function name. The message may include a supported RIC service style list item. Here, each item may be configured in a layered manner. The layered level may be expressed through a ">" indicator. The message may further include a RIC service style type. The message may further include a RIC service style list. The RIC service style list item may be defined for each RIC service style type. Here, the type may imply a category of the RIC service style exemplified in FIG. 20.

The RIC service style list may include a list of one or more supportable RIC service styles. An index of a RIC service style that can be supported through each item in the RIC service style list may be delivered to the RIC from the E2 node. The RIC may identify a predefined RIC service style as shown in the table in FIG. 20 through a category (i.e., RIC service style type) and an index (RIC service style index or control action index). Although not shown in FIG. 21, the RIC may transmit a RIC control message to the E2 node based on the information obtained through FIGS. 20 and 21. The RIC control message may include a configuration for a corresponding service. The service included in the RIC control message may be service model-specific of E2SM.

Although not mentioned in FIGS. 18 to 21, in some embodiments of the disclosure, with regard to an E2 node, a supportable service may be predefined according to the type of the E2 node.

A DU and a CU may operate according to function split for each layer. The CU may be implemented to perform a higher layer function (upper layers) (e.g., packet data convergence protocol (PDCP), RRC), radio resource control (RRC), service data adaptation protocol (SDAP)). The DU may be implemented to perform a lower layer function (lower layers) (e.g., radio link control (RLC), medium access control (MAC), and physical (PHY)). Further, as an example, in the case of a control plane (CU-CP), PDCP and RRC layer functions may be supported, and a CU-UP may support PDCP and SDAP layer functions. According to this function split, services supported by the E2 node may be predefined according to the type of the E2 node. Accordingly, at the time of transmission of the setup request message to the RIC, the E2 node may notify the RIC of the transmission by including, in the message, an index number of a RIC service style defined according to the corresponding type. It goes without saying that the method defined in FIGS. 18 to 21 may be applied to this embodiment in the same or similar manner.

The RIC that has received the supportable service from the E2 node may deliver configuration for a corresponding service to the E2 node. The RIC may transmit a RIC control message to the E2 node for configuration for each service. According to embodiments of the disclosure, the RIC may transmit a message associated with the E2 service model to the E2 node. As an example, the RIC may transmit an E2 control message as shown in FIG. 13. According to an embodiment of the disclosure, the RIC may transmit a RIC control request message to the E2 node. The E2 node may transmit a RIC control acknowledgment or RIC control failure message to the RIC.

A control message transmitted by the RIC to the E2 node may be configured as follows.

This message is sent by a Near-RT RIC to an E2 Node to initiate or resume a control function logic.

Direction: Near-RT RIC→E2 Node.

TABLE 3

| IE/Group Name | Presence | Range | IE type and reference | Semantics description | Criticality | Assigned Criticality |
|---|---|---|---|---|---|---|
| message type | M | | 9.2.3 | | YES | reject |
| RIC Request ID | M | | 9.2.7 | | YES | reject |
| RAN Function ID | M | | 9.2.8 | | YES | reject |
| RIC Call Process ID | O | | 9.2.18 | | YES | reject |
| RIC control header | M | | 9.2.20 | | YES | reject |
| RIC control message | M | | 9.2.19 | | YES | reject |
| RIC Control Ack Request | O | | 9.2.21 | | YES | reject |

Hereinafter, examples of a RIC control header and a control message for each RIC service style will be described with reference to FIGS. 22 and 23 to 26, respectively.

FIG. 22 illustrates a RIC control header in RIC control according to an embodiment of the disclosure. The RIC control header is exemplified as follows.

This information element carries the RIC control header used for CONTROL procedures.

TABLE 4

| IE/Group Name | Presence | Range | IE type and reference | Semantics description |
|---|---|---|---|---|
| RIC Control header | M | | OCTET STRING | Defined in RAN Function specific E2 service model [3] |

One or more identities (IDs) may be used to define the scope of the RIC control. According to an embodiment of the disclosure, the RIC control header may be used to indicate a RIC control service style of the above-described category and a specific RIC control service. According to an embodiment of the disclosure, at least some of the following categories may be hierarchical. Further, according to an embodiment of the disclosure, at least some of the following categories may be mutually independent.

UE ID: Terminal ID.

Group ID: One or more UEs may be included in one group.

Cell ID: Cell ID implies a cell on an access network.

Slice ID: Here, slice may imply a network slice.

QoS ID: QoS implies QoS class identifier (QCI) or 5G QoS Identifier (5QI).

DRB ID: implies an ID of a data radio bearer (DRB).

QoS Flow ID: implies ID of QoS Flow. The SDAP layer may perform QoS Flow and DRB mapping.

PDU session ID: implies an ID of a protocol data unit (PDU) session.

FIG. 23 illustrates a RIC control message in RIC control according to an embodiment of the disclosure.

Referring to FIG. 23, an example of a RIC message transmitted by the RIC to the E2 node in a situation where the index of the RIC service style is indicated as "DRB QoS Modification" is described. "M" stands for mandatory and "O" stands for optional.

Referring to FIG. 23, the RIC control message may include a DRB QoS modification list. The DRB QoS modification list may include one or more pieces of DRB information. Each DRB information may be identified through a DRB ID. The DRB QoS modification list may include, with regard to each DRB, DRB ID and QoS information. The QoS information may be E-UTRAN QoS information (may include QCI for LTE RAN, for example) or DRB QoS information (may include 5QI for NG-RAN, for example).

Although not referenced in FIG. 23, an information element (IE) content of F1-related standard document (e.g., 3GPP technical specification (TS) 38.473) may be referenced for an IE of FIG. 26 according to an embodiment of the disclosure.

FIG. 24 illustrates a RIC control message in RIC control according to an embodiment of the disclosure.

Referring to FIG. 24, an example of a RIC message transmitted by a RIC to an E2 node in a situation where the index of the RIC service style is indicated as "QoS Flow to DRB mapping update" is described. "M" stands for mandatory and "O" stands for optional.

Referring to FIG. 24, the RIC control message may include a QoS Flow to DRB mapping list. The QoS Flow to DRB mapping list may include one or more pieces of DRB information. Each DRB information may be identified through a DRB ID. The DRB QoS modification list may include, with regard to each DRB, a QoS flow list. The QoS flow list may include one or more QoS flows for the corresponding DRB.

Although not referenced in FIG. 24, an information element (IE) content of F1-related standard document (e.g., 3GPP TS 38.473) may be referenced for an IE of FIG. 26 according to an embodiment of the disclosure.

FIG. 25 illustrates a RIC control message in RIC control according to an embodiment of the disclosure.

Referring to FIG. 25, an example of a RIC message transmitted by a RIC to an E2 node in a situation where the index of RIC service style is indicated as "Logical Channel Reconfiguration" is described. "M" stands for mandatory and "O" stands for optional.

Referring to FIG. 25, the RIC control message may include a logical channel configuration list. The logical channel configuration list may include one or more pieces of logical channel information. Each logical channel information may be identified through a logical channel identity (ID). A priority, bit rate, and bucket size duration for each logical channel may be defined. As an example, the maximum number of possible logical channels may be 32.

Although not referenced in FIG. 25, an information element (IE) content of F1-related standard document (e.g., 3GPP TS 38.473) may be referenced for an IE of FIG. 26 according to an embodiment of the disclosure.

FIG. 26 illustrates a RIC control message in RIC control according to an embodiment of the disclosure.

Referring to FIG. 26, an example of a RIC message transmitted by a RIC to an E2 node in a situation where the index of the RIC service style is indicated as "Radio Bearer Admission control" is described. "M" stands for mandatory and "O" stands for optional.

Referring to FIG. 26, the RIC control message may include one or more DRB lists. According to an embodiment of the disclosure, the one or more DRB lists may include a DRB addition list (or an addition/modification list). The DRB addition list may include one or more pieces of DRB information. Each DRB information may be identified through a DRB ID. The DRB addition list may include, with regard to each DRB, DRB ID and QoS information. The QoS information may be DRB QoS information (may include 5QI for NG-RAN, for example). Alternatively, although not shown in FIG. 26, the QoS information may be E-UTRAN QoS information (may include QCI for LTE RAN, for example). As an example, the maximum number of possible DRBs may be 64.

According to an embodiment of the disclosure, one or more DRB lists may include a DRB release list. The DRB release list may include one or more pieces of DRB information. Each DRB information may be identified through a DRB ID. The DRB release list may include a DRB ID for each DRB. As an example, the maximum number of possible DRBs may be 64.

Although not referenced in FIG. 26, an information element (IE) content of F1-related standard document (e.g., 3GPP TS 38.473) may be referenced for an IE of FIG. 26 according to an embodiment of the disclosure.

According to embodiments of the disclosure, a method performed by a near-real time (RT) radio access network (RAN) intelligent controller (RIC) may include generating a RIC control request message, transmitting the RIC control request message to an E2 node, and receiving, from the E2 node, a RIC control acknowledge message or a RIC control failure message, wherein the RIC control request message includes a control header and a control message, the control header includes a user equipment (UE) identifier (ID), the control message includes one or more parameters regarding a specific control service, and the specific control service is indicated by a RIC control service style corresponding to a category and an index of the specific control service in the RIC control service style.

According to an embodiment of the disclosure, in case that the RIC control service style is radio bearer control, the specific control service is one of a plurality of first services, and the plurality of first services may include a data radio bearer (DRB) quality of service (QoS) configuration, a QoS flow mapping configuration, a logical channel configuration, and a radio bearer admission control.

According to an embodiment of the disclosure, in case that the specific control service is the DRB QoS configuration, the one or more parameters may include DRB identification information and $5^{th}$ generation (5G) quality of service (QoS) identifier (5QI).

According to an embodiment of the disclosure, in case that the specific control service is the QoS flow mapping configuration, the one or more parameters may include DRB identification information and a QoS flow list, and the QoS flow list may include, with regard to each QoS flow, a QoS flow identifier and a QoS flow mapping indication.

According to an embodiment of the disclosure, in case that the specific control service is the logical channel configuration, the one or more parameters may include logical channel identification information, a priority, a priority bit rate, and a bucket size duration.

According to an embodiment of the disclosure, in case that the RIC control service style is mobility control, the specific control service is one of a plurality of second services, and the plurality of second services may indicate different handover types.

According to an embodiment of the disclosure, the method may further include receiving a setup message for indicating a supportable RIC control service from the E2 node.

According to an embodiment of the disclosure, the setup message may include a radio access network (RAN) function definition information element (IE), and the RAN function definition IE may include one or more RIC control service styles, and one or more indices of one or more services corresponding to each RIC control service style in the one or more RIC control service styles.

According to an embodiment of the disclosure, the setup message may be an E2 setup request message or a RIC service update message.

According to an embodiment of the disclosure, the E2 node may be one of a next generation node B (gNB), a distributed unit (DU), an evolved node B (eNB), a gNB-central unit (gNB-CU), an en-gNB, and an ng-eNB.

According to embodiments of the disclosure of the disclosure, a method performed by an E2 node may include receiving a radio access network (RAN) intelligent controller (RIC) control request message from a near-real time (RT) RIC, and transmitting, to the near-RT RIC, a RIC control acknowledge message or a RIC control failure message, wherein the RIC control request message includes a control header and a control message, the control header includes a user equipment (UE) identifier (ID), the control message includes one or more parameters regarding a specific control service, and the specific control service is indicated by a RIC control service style corresponding to a category and an index of the specific control service in the RIC control service style.

According to an embodiment of the disclosure, in case that the RIC control service style is radio bearer control, the specific control service is one of a plurality of first services, and the plurality of first services may include a data radio bearer (DRB) quality of service (QoS) configuration, a QoS flow mapping configuration, a logical channel configuration, and a radio bearer admission control.

According to an embodiment of the disclosure, in case that the specific control service is the DRB QoS configuration, the one or more parameters may include DRB identification information and $5^{th}$ generation (5G) quality of service (QoS) identifier (5QI).

According to an embodiment of the disclosure, in case that the specific control service is the QoS flow mapping configuration, the one or more parameters may include DRB identification information and a QoS flow list, and the QoS flow list includes, with regard to each QoS flow, a QoS flow identifier and a QoS flow mapping indication.

According to an embodiment of the disclosure, in case that the specific control service is the logical channel configuration, the one or more parameters may include logical channel identification information, a priority, a priority bit rate, and a bucket size duration.

According to an embodiment of the disclosure, in case that the RIC control service style is mobility control, the specific control service is one of a plurality of second services, and the plurality of second services may indicate different handover types.

According to an embodiment of the disclosure, the method may further include transmitting a setup message for indicating a supportable RIC control service to the near-RT RIC.

According to an embodiment of the disclosure, the setup message may include a radio access network (RAN) function definition information element (IE), and the RAN function definition IE may include one or more RIC control service styles, and one or more indices of one or more services corresponding to each RIC control service style in the one or more RIC control service styles.

According to an embodiment of the disclosure, the setup message may be an E2 setup request message or a RIC service update message.

According to an embodiment of the disclosure, the E2 node may be one of a next generation node B (gNB), a distributed unit (DU), an evolved node B (eNB), a gNB-central unit (gNB-CU), an en-gNB, and an ng-eNB.

According to the RRM control of a RIC according to various embodiments of the disclosure, IPC cost may be reduced. In particular, when DU/CU/RIC are located in the same environment, the cost for message relay may be reduced. The RIC may perform everything except for message delivery, so as to resolve the problem of mutuality according to the operation between vendors. In addition, an intelligent function of the RIC may be upgraded to replace a specific function between DUs and CU-UPs.

By using the existing E2SM-KPM, an E2 control message may be defined individually based on a RAN function that can be supported by each E2 node, but in the case of multi-vendor support, restrictions on the implementation described in FIGS. 10 and 11A may occur. The RIC according to various embodiments of the disclosure may fully control the O-CU-CP, O-CU-UP, and O-DU by using a RRC E2 control message for control message relay by utilizing the existing E2SM-NI and E2SM-KPM. As the full control is made possible by the RIC, efficient management may be performed. Particularly, effective load balancing can be achieved, especially in a service area in which vendors overlap.

In the disclosure, in order to describe the operation of an E2 node according to RRM control of a RIC, an operation mode is named "zombie mode" to describe the operations of each entity, but embodiments of the disclosure are not limited thereto. In the embodiments of the disclosure, in addition to a zombie mode, another mode for performing the functions of CU or DU instead may be used.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks, such as the Internet, Intranet, local area network (LAN), Wide LAN (WLAN), and storage area network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a near-real time (RT) radio access network (RAN) intelligent controller (RIC) in a mobile communication system, the method comprising:

transmitting a RIC control request message to an E2 node; and receiving, from the E2 node, a RIC control acknowledge message, wherein the RIC control request message comprises a control header and a control message, wherein the control header comprises a user equipment (UE) identifier (ID), and information on a RIC control service style type, and information on a control action indicating an index of the control action which supports the RIC control service style type, wherein the control message comprises one or more parameters related with the control action.

2. The method of claim 1, wherein in case that the RIC control service style type is a radio bearer control, the control action comprises a data radio bearer (DRB) quality of service (QoS) configuration, a QoS flow mapping configuration, a logical channel configuration, and a radio bearer admission control.

3. The method of claim 2, wherein in case that the control action is the DRB QoS configuration, the one or more parameters comprise DRB identification information and $5^{th}$ generation (5G) quality of service (QoS) identifier (5QI), wherein in case that the control action is the QoS flow mapping configuration, the one or more parameters comprise DRB identification information and a QoS flow list, and the QoS flow list comprises, with regard to each QoS flow, a QoS flow identifier and a QoS flow mapping indication, and wherein in case that the control action is the logical channel configuration, the one or more parameters comprise logical channel identification information, a priority, a priority bit rate, and a bucket size duration.

4. The method of claim 1, wherein in case that the RIC control service style is mobility control, the control action comprises different handover types.

5. The method of claim 1, further comprising:

receiving a setup message for indicating a supportable RIC control service from the E2 node, wherein the setup message comprises a radio access network (RAN) function definition information element (IE), wherein the RAN function definition IE comprises:

one or more RIC control service styles, and one or more indices of one or more services corresponding to each RIC control service style in the one or more RIC control service styles, and wherein the setup message is an E2 setup request message or a RIC service update message.

6. A method performed by an E2 node in a mobile communication system, the method comprising:

receiving a radio access network (RAN) intelligent controller (RIC) control request message from a near-real time (RT) RIC; and transmitting, to the near-RT RIC, a RIC control acknowledge message, wherein the RIC control request message comprises a control header and a control message, wherein the control header comprises a user equipment (UE) identifier (ID), and information on a RIC control service style type, and information on a control action indicating an index of the control action which supports the RIC control service style type, wherein the control message comprises one or more parameters related with the control action.

7. The method of claim 6, wherein in case that the RIC control service style type is a radio bearer control, the control action comprises a data radio bearer (DRB) quality of service (QoS) configuration, a QoS flow mapping configuration, a logical channel configuration, and a radio bearer admission control.

8. The method of claim 7, wherein in case that the control action is the DRB QoS configuration, the one or more parameters comprise DRB identification information and $5^{th}$ generation (5G) quality of service (QoS) identifier (5QI), wherein in case that the control action is the QoS flow mapping configuration, the one or more parameters comprise DRB identification information and a QoS flow list, and the QoS flow list comprises, with regard to each QoS flow, a QoS flow identifier and a QoS flow mapping indication, and wherein in case that the control action is the logical channel configuration, the one or more parameters comprise logical channel identification information, a priority, a priority bit rate, and a bucket size duration.

9. The method of claim 6, wherein in case that the RIC control service style is mobility control, the control action comprises different handover types.

10. The method of claim 6, further comprising:

transmitting a setup message for indicating a supportable RIC control service to the near-RT RIC, wherein the setup message comprises a radio access network (RAN) function definition information element (IE), wherein the RAN function definition IE comprises:

one or more RIC control service styles, and one or more indices of one or more services corresponding to each RIC control service style in the one or more RIC control service styles, and wherein the setup message is an E2 setup request message or a RIC service update message.

11. A near-real time (RT) radio access network (RAN) intelligent controller (RIC) in a mobile communication system, the near-RT RIC comprising:

a transceiver; and a controller coupled with the transceiver and configured to:

transmit a RIC control request message to an E2 node, and receive, from the E2 node, a RIC control acknowledge message, wherein the RIC control request message comprises a control header and a control message, wherein the control header comprises a user equipment (UE) identifier (ID), and information on a RIC control service style type, and information on a control action indicating an index of the control action which supports the RIC control service style type, wherein the control message comprises one or more parameters related with the control action.

12. The near-RT RIC of claim 11, wherein in case that the RIC control service style type is a radio bearer control, the control action comprises a data radio bearer (DRB) quality of service (QoS) configuration, a QoS flow mapping configuration, a logical channel configuration, and a radio bearer admission control.

13. The near-RT RIC of claim 12, wherein in case that the control action is the DRB QoS configuration, the one or more parameters comprise DRB identification information and $5^{th}$ generation (5G) quality of service (QoS) identifier (5QI), wherein in case that the control action is the QoS flow mapping configuration, the one or more parameters comprise DRB identification information and a QoS flow list, and the QoS flow list comprises, with regard to each QoS flow, a QoS flow identifier and a QoS flow mapping indication, and wherein in case that the control action is the logical channel configuration, the one or more parameters comprise logical channel identification information, a priority, a priority bit rate, and a bucket size duration.

14. The near-RT RIC of claim 11, wherein in case that the RIC control service style is mobility control, the control action comprises different handover types.

15. The near-RT RIC of claim 11, wherein the controller is further configured to receive a setup message for indicating a supportable RIC control service from the E2 node, wherein the setup message comprises a radio access network (RAN) function definition information element (IE), wherein the RAN function definition IE comprises:

one or more RIC control service styles, and one or more indices of one or more services corresponding to each RIC control service style in the one or more RIC control service styles, and wherein the setup message is an E2 setup request message or a RIC service update message.

16. An E2 node in a mobile communication system, the E2 node comprising:

a transceiver; and a controller coupled with the transceiver and configured to:

receive a radio access network (RAN) intelligent controller (RIC) control request message from a near-real time (RT) RIC, and transmit, to the near-RT RIC, a RIC control acknowledge message, wherein the RIC control request message comprises a control header and a control message, wherein the control header comprises a user equipment (UE) identifier (ID), and information on a RIC control service style type, and information on a control action indicating an index of the control action which supports the RIC control service style type, wherein the control message comprises one or more parameters related with the control action.

17. The E2 node of claim 16, wherein in case that the RIC control service style type is a radio bearer control, the control action comprises a data radio bearer (DRB) quality of service (QoS) configuration, a QoS flow mapping configuration, a logical channel configuration, and a radio bearer admission control.

18. The E2 node of claim 17, wherein in case that the control action is the DRB QoS configuration, the one or more parameters comprise DRB identification information and $5^{th}$ generation (5G) quality of service (QoS) identifier (5QI), wherein in case that the control action is the QoS flow mapping configuration, the one or more parameters comprise DRB identification information and a QoS flow list, and the QoS flow list comprises, with regard to each QoS flow, a QoS flow identifier and a QoS flow mapping indication, and wherein in case that the control action is the logical channel configuration, the one or more parameters comprise logical channel identification information, a priority, a priority bit rate, and a bucket size duration.

19. The E2 node of claim 16, wherein in case that the RIC control service style is mobility control, the control action comprises different handover types.

20. The E2 node of claim 16, wherein the controller is further configured to transmit a setup message for indicating a supportable RIC control service to the near-RT RIC, wherein the setup message comprises a radio access network (RAN) function definition information element (IE), wherein the RAN function definition IE comprises:

one or more RIC control service styles, and one or more indices of one or more services corresponding to each RIC control service style in the one or more RIC control service styles, and wherein the setup message is an E2 setup request message or a RIC service update message.

* * * * *